(12) United States Patent
Lewis et al.

(10) Patent No.: US 12,481,649 B2
(45) Date of Patent: Nov. 25, 2025

(54) SYSTEMS AND METHODS FOR RETRIEVING TELEMATICS DATA

(71) Applicant: Geotab Inc., Oakville (CA)

(72) Inventors: Daniel J. Lewis, Cambridge (CA);
Terence Michael Branch, Oakville (CA); Robert Bradley, Oakville (CA);
Shadi Mahdiani, Brampton (CA)

(73) Assignee: Geotab Inc., Oakville (CA)

( * ) Notice: Subject to any disclaimer, the term of this patent is extended or adjusted under 35 U.S.C. 154(b) by 0 days.

(21) Appl. No.: 18/767,261

(22) Filed: Jul. 9, 2024

(65) Prior Publication Data

US 2025/0021547 A1 Jan. 16, 2025

Related U.S. Application Data

(60) Provisional application No. 63/526,059, filed on Jul. 11, 2023.

(51) Int. Cl.
*G06F 16/00* (2019.01)
*G06F 16/242* (2019.01)
(Continued)

(52) U.S. Cl.
CPC ...... *G06F 16/243* (2019.01); *G06F 16/24522* (2019.01); *G06F 16/2455* (2019.01);
(Continued)

(58) Field of Classification Search
CPC .... G06F 16/3329; G06F 16/338; G06F 21/54; G06F 40/169; G06F 40/279;
(Continued)

(56) References Cited

U.S. PATENT DOCUMENTS 1,188,741 A 6/1916 Dunkerley
7,505,841 B2 3/2009 Sun et al.
(Continued)

FOREIGN PATENT DOCUMENTS

WO WO2008137855 A2 * 1/2008
WO WO 2009075912 A1 * 6/2009
(Continued)

OTHER PUBLICATIONS

A. Tripathy et al., "An Intelligent Data Processing Engine for Spatial Data Management in Vehicular Telematics System", 2009 International Conference on Advances in Computing, Control, and Telecommunication Technologies (Dec. 2009, pp. 517-521).*
(Continued)

*Primary Examiner* — Srirama Channavajjala
(74) *Attorney, Agent, or Firm* — Gabriel F. Rogers

(57) ABSTRACT

The present disclosure relates to systems and methods for retrieving telematics data. A method for retrieving telematics data may comprise at least one processor operating to: provide a plurality of databases, each database storing at least telematics data originating from a plurality of telematics devices installed in a plurality of vehicles; receive a natural language request from a user; generate, using a large language model (LLM) that does not have access to the plurality of databases, an executable query for retrieving a portion of the telematics data that is responsive to the natural language request from the database by inputting into the LLM at least: a contextual prompt, and the natural language request; execute the executable query; and return at least the portion of the telematics data to the user.

19 Claims, 7 Drawing Sheets

(51) Int. Cl.
*G06F 16/2452* (2019.01)
*G06F 16/2455* (2019.01)
*G06F 16/28* (2019.01)
*G06F 16/3329* (2025.01)
*G06F 16/338* (2019.01)
*G06N 20/00* (2019.01)

(52) U.S. Cl.
CPC ........ *G06F 16/285* (2019.01); *G06F 16/3329* (2019.01); *G06F 16/338* (2019.01); *G06N 20/00* (2019.01)

(58) Field of Classification Search
CPC .. G06F 40/134; G06F 16/243; G06F 16/2455; G06F 16/24522; G06F 16/285; G06N 20/00
See application file for complete search history.

(56) References Cited

U.S. PATENT DOCUMENTS

| | | | |
|---|---|---|---|
| 7,676,087 | B2 | 3/2010 | Dhua et al. |
| 7,725,216 | B2 | 5/2010 | Kim |
| 8,509,987 | B2 | 8/2013 | Resner |
| 9,502,030 | B2 * | 11/2016 | Winter .................... G10L 15/22 |
| 10,056,008 | B1 * | 8/2018 | Sweany ............... G09B 19/167 |
| 10,204,159 | B2 | 2/2019 | Angel et al. |
| 10,699,564 | B1 * | 6/2020 | Lewis .................... G06N 20/00 |
| 10,708,547 | B2 * | 7/2020 | Newman ............. G08G 1/0129 |
| 10,728,420 | B2 | 7/2020 | Popa |
| 10,997,434 | B2 | 5/2021 | Kurian et al. |
| 11,488,422 | B1 | 11/2022 | Wu et al. |
| 11,558,808 | B1 * | 1/2023 | Fox ....................... H04W 48/04 |
| 11,741,760 | B1 | 8/2023 | Dubin et al. |
| 11,748,377 | B1 | 9/2023 | Zhang et al. |
| 11,800,317 | B1 | 10/2023 | Dugar et al. |
| 11,861,955 | B1 | 1/2024 | Dubin et al. |
| 11,868,919 | B1 | 1/2024 | Zhang et al. |
| 11,947,872 | B1 * | 4/2024 | Mahler-Haug .......... G10L 15/08 |
| 11,975,685 | B1 | 5/2024 | Innocenzi et al. |
| 11,989,001 | B1 | 5/2024 | Eihattab et al. |
| 11,995,546 | B1 | 5/2024 | Srinivasan et al. |
| 2003/0137194 | A1 * | 7/2003 | White ....................... B60L 3/12 307/10.1 |
| 2005/0182534 | A1 * | 8/2005 | Legate ................... G07C 5/008 701/31.4 |
| 2007/0050191 | A1 | 3/2007 | Weider et al. |
| 2010/0185638 | A1 * | 7/2010 | Wright ................ G06F 16/5838 707/706 |
| 2010/0317420 | A1 * | 12/2010 | Hoffberg ............ G06Q 30/0282 463/1 |
| 2013/0346077 | A1 * | 12/2013 | Mengibar ............. G10L 15/197 704/235 |
| 2020/0073984 | A1 * | 3/2020 | Sen ........................ G06F 16/243 |
| 2020/0334924 | A1 * | 10/2020 | Wells ........................ H04L 67/04 |
| 2021/0101619 | A1 * | 4/2021 | Weast .................. G06F 16/2457 |
| 2021/0193121 | A1 * | 6/2021 | Li ........................... G10L 15/063 |
| 2021/0375462 | A1 * | 12/2021 | Rayos ...................... G09B 19/00 |
| 2022/0188329 | A1 * | 6/2022 | Prall ................... G06Q 30/0201 |
| 2022/0245955 | A1 | 8/2022 | Freeman et al. |
| 2023/0162287 | A1 * | 5/2023 | Dahl ...................... G06Q 40/08 705/4 |
| 2023/0222849 | A1 * | 7/2023 | Hockin .................. G06F 18/214 701/1 |
| 2024/0005675 | A1 | 1/2024 | Lelowicz et al. |
| 2024/0062067 | A1 * | 2/2024 | Hu ......................... G06V 40/193 |
| 2024/0095460 | A1 * | 3/2024 | Xu ........................... G06F 40/30 |
| 2024/0289596 | A1 * | 8/2024 | Williams .............. G06N 3/0475 |

FOREIGN PATENT DOCUMENTS

| | | | |
|---|---|---|---|
| WO | WO2017218257 A1 * | 12/2017 | |
| WO | WO 2019191226 A1 * | 10/2019 | |
| WO | WO2020018435 * | 1/2020 | |

OTHER PUBLICATIONS

Piotr Klosowski, "Deep Learning for Natural Language Processing and Language Modelling", 2018 Signal Processing: Algorithms, Architectures, Arrangements, and Applications (SPA) (Sep. 2018, pp. 223-228).*

Pathak, A et al., "An Algorithm Based Design and Query Processing of Spatial Data Management in Vehicular Telematics System", 2009 International Joint Conference on Computational Sciences and Optimization (vol. 1, Apr. 2009, pp. 796-799).*

Animesh Tripathy et al., "An Intelligent Data Processing Engine for Spatial Data Management in Vehicular Telematics System", 2009 International Conference on Advances in Computing, Control, and Telecommunication Technologies, Dec. 2009, pp. 517-521.*

* cited by examiner

SYSTEMS AND METHODS FOR RETRIEVING TELEMATICS DATA

CROSS-REFERENCE TO RELATED APPLICATIONS

This application claims priority to and the benefit of U.S. Patent Application Ser. No. 63/526,059, filed on Jul. 11, 2023, which is hereby incorporated by reference in its entirety.

TECHNICAL FIELD

The present disclosure generally relates to the retrieval of telematics data from a database. More specifically, the present disclosure relates to retrieving telematics data based on a natural language request received from a user.

BACKGROUND

Today, many vehicles rely on computer-based systems (e.g., one or more processors) for their operation. As will be appreciated, such systems manage and/or produce many types of data associated with various aspects of the vehicle during the operation thereof that may generally be referred to as "telematics data". In more detail, telematics data may include any information, parameters, attributes, characteristics, and/or features associated with the vehicle, such as, but not limited to, location data, speed data, acceleration data, fluid level data, energy data, engine data, brake data, transmission data, odometer data, vehicle identifying data, error/diagnostic data, tire pressure data, seatbelt data, and airbag data. The telematics data may be collected from the vehicle using, for example, a telematics device.

Telematics data may therefore include data relating to many different aspects a vehicle's operation. As will be appreciated, such a variety of information may be challenging to manage by a user, and in particular a user managing a vehicle fleet. For example, conventionally, a user may have to retrieve extended, comprehensive reports of the above-mentioned types of telematics data in order to gain insights about their vehicle or vehicle fleet. Such reports may be time-consuming to review, may require a lot of data to acquire (e.g., download), and may require a lot of space to store (e.g., in terms of bytes of a data storage). As well, it may be challenging to identify certain outliers, trends, patterns, etc. from such reports, particularly if the reports include data for many vehicles (e.g., a vehicle fleet).

A need therefore exists for improved systems and methods for retrieving telematics data.

SUMMARY

In one aspect, the present disclosure relates to a system for retrieving telematics data, the system comprising: at least one data storage operable to store at least a plurality of databases, each database storing telematics data originating from a plurality of telematics devices installed in a plurality of vehicles; and at least one processor in communication with the at least one data storage, the at least one processor operable to: receive a natural language request from a user, the natural language request comprising at least one textual question relating to the telematics data stored within one of the databases; generate, using a large language model (LLM) that does not have access to the plurality of databases, an executable query for retrieving a portion of the telematics data that is responsive to the natural language request from the database by inputting into the LLM at least: a contextual prompt, the contextual prompt providing to the LLM at least one or more features of the database, an expected structure of the executable query, and one or more example natural language requests and corresponding executable query outputs, and the natural language request; execute the executable query for retrieving the portion of the telematics data from the database; and return at least the portion of the telematics data to the user, whereby the natural language request is responded to without providing the LLM with access to the telematics data stored on the plurality of databases.

According to an embodiment, the at least one processor is operable to generate the executable query by first inputting the contextual prompt into the LLM and then inputting the natural language request into the LLM.

According to an embodiment, the at least one processor is operable to generate the executable query by inputting the contextual prompt and the natural language request together into the LLM.

According to an embodiment, wherein the at least one processor is further operable to merge the contextual prompt and the natural language request prior to the input thereof into the LLM.

According to an embodiment, the at least one processor is further operable to modify the executable query based on database identifying information, a type of the portion of the telematics data that is responsive to the natural language request, an identity of the user, or a combination thereof.

According to an embodiment, the at least one processor is further operable to revert modifying of the executable query after the execution thereof.

According to an embodiment, the at least one processor is operable to return the portion of the telematics data and the executable query to the user.

According to an embodiment, the at least one processor is further operable to: determine whether the executing of the executable query was successful in retrieving the portion of the telematics data; and generate, if the executing of the executable query was unsuccessful, an error message comprising at least a textual description of why the telematics data was not retrieved.

According to an embodiment, the at least one processor is further operable to: generate a corrected executable query for retrieving the portion of the telematics data from the database by inputting into the LLM at least the contextual prompt, the natural language request, and the error message; and execute the corrected executable query for retrieving the portion of the telematics data from the database.

According to an embodiment, the at least one processor is further operable to: determine whether the executing of the corrected executable query was successful in retrieving the portion of the telematics data; and repeat, if the executing of the corrected executable query was unsuccessful, the generating of the error message, the generating of the corrected executable query, and the executing of the corrected executable query.

According to an embodiment, the at least one processor is operable to repeat the generating of the error message, the generating of the corrected executable query, and the executing of the corrected executable query until the executing of the corrected executable query retrieves the portion of the telematics data from the database.

According to an embodiment, the at least one processor is operable to: repeat the generating of the error message, the generating of the corrected executable query, and the executing of the corrected executable query a predetermined number of times; and return, if the repeating is performed the predetermined number of times without successfully retrieving the portion of the telematics data, a final error message to the user, the final error message comprising at least a textual description of why the telematics data was not retrieved.

According to an embodiment, the final error message further comprises a textual request for an updated natural language request from the user.

According to an embodiment, the at least one processor is operable to generate the corrected executable query by inputting two or more of the contextual prompt, the natural language request, and the error message together into the LLM.

According to an embodiment, the at least one processor is further operable to merge the contextual prompt, the natural language request, and the error message prior to the input thereof into the LLM.

According to an embodiment, the at least one processor is further operable to send the natural language request and the executable query that is responsive thereto to the at least one data storage for storage thereon.

According to an embodiment, the at least one processor is further operable to receive from the user an indication of whether the executable query was responsive to the natural language request.

According to an embodiment, the LLM comprises a generative artificial intelligence model.

According to an embodiment, the one or more features of the database comprise information relating to how the telematics data is stored in the database, a type of telematics data stored in the database, or a combination thereof.

According to an embodiment, the telematics data is curated telematics data.

In another aspect, the present disclosure relates to a method for retrieving telematics data, the method comprising operating at least one processor to: provide a plurality of databases, each database storing at least telematics data originating from a plurality of telematics devices installed in a plurality of vehicles; receive a natural language request from a user, the natural language request comprising at least one textual question relating to the telematics data stored within one of the plurality of databases; generate, using a large language model (LLM) that does not have access to the plurality of databases, an executable query for retrieving a portion of the telematics data that is responsive to the natural language request from the database by inputting into the LLM at least: a contextual prompt, the contextual prompt providing to the LLM at least one or more features of the database, an expected structure of the executable query, and one or more example natural language requests and corresponding executable query outputs, and the natural language request; execute the executable query for retrieving the portion of the telematics data from the database; and return at least the portion of the telematics data to the user, whereby the natural language request is responded to without providing the LLM with access to the telematics data stored on the plurality of databases.

According to an embodiment, generating of the executable query comprises operating the at least one processor to first input the contextual prompt into the LLM and then input the natural language request into the LLM.

According to an embodiment, generating of the executable query comprises operating the at least one processor to input the contextual prompt and the natural language request together into the LLM.

According to an embodiment, the method further comprises operating the at least one processor to merge the contextual prompt and the natural language request prior to the input thereof into the LLM.

According to an embodiment, the method further comprises operating the at least one processor to modify the executable query based on database identifying information, a type of the portion of the telematics data that is responsive to the natural language request, an identity of the user, or a combination thereof.

According to an embodiment, the method further comprises operating the at least one processor to revert the modifying of the executable query after the execution thereof.

According to an embodiment, the returning of the portion of the telematics data further comprises operating the at least one processor to return the portion of the telematics data and the executable query to the user.

According to an embodiment, the method further comprises operating the at least one processor to: determine whether the executing of the executable query was successful in retrieving the portion of the telematics data; and generate, if the executing of the executable query was unsuccessful, an error message comprising at least a textual description of why the telematics data was not retrieved.

According to an embodiment, the method further comprises operating the at least one processor to: generate a corrected executable query for retrieving the portion of the telematics data from the database by inputting into the LLM at least the contextual prompt, the natural language request, and the error message; and execute the corrected executable query for retrieving the portion of the telematics data from the database.

According to an embodiment, the method further comprises operating the at least one processor to: determine whether the executing of the corrected executable query was successful in retrieving the portion of the telematics data; and repeat, if the executing of the corrected executable query was unsuccessful, the generating of the error message, the generating of the corrected executable query, and the executing of the corrected executable query.

According to an embodiment, the method comprises operating the at least one processor to repeat the generating of the error message, the generating of the corrected executable query, and the executing of the corrected executable query until the executing of the corrected executable query retrieves the portion of the telematics data from the database.

According to an embodiment, the method comprises operating the at least one processor to: repeat the generating of the error message, the generating of the corrected executable query, and the executing of the corrected executable query a predetermined number of times; and return, if the repeating is performed the predetermined number of times without successfully retrieving the portion of the telematics data, a final error message to the user, the final error message comprising at least a textual description of why the telematics data was not retrieved.

According to an embodiment, the final error message further comprises a textual request for an updated natural language request from the user.

According to an embodiment, the method comprises operating the at least one processor to generate the corrected executable query by inputting two or more of the contextual prompt, the natural language request, and the error message together into the LLM.

According to an embodiment, the method further comprises operating the at least one processor to merge the contextual prompt, the natural language request, and the error message prior to the input thereof into the LLM.

According to an embodiment, the method further comprises operating the at least one processor to send the natural language request and the executable query to at least one data storage for storage thereon.

According to an embodiment, the method further comprises operating the at least one processor to receive from the user an indication of whether the executable query was responsive to the natural language request.

According to an embodiment, the LLM comprises a generative artificial intelligence model.

According to an embodiment, the one or more features of the database comprise information relating to how the telematics data is stored in the database, a type of telematics data stored in the database, or a combination thereof.

According to an embodiment, the telematics data is curated telematics data.

In another aspect, the present disclosure relates to a system for training a machine learning model, the system comprising: at least one data storage operable to store at least a plurality of databases, each database storing telematics data originating from a plurality of telematics devices installed in a plurality of vehicles; and at least one processor in communication with the at least one data storage, the at least one processor operable to: generate training data for training the machine learning model by: generating a natural language request comprising a textual question relating to the telematics data by inputting into the machine learning model at least: a contextual prompt providing to the machine learning model at least one or more features of the plurality of databases; and instructions to generate the natural language request based on the contextual prompt; generating an executable query for retrieving a portion of the telematics data that is responsive to the natural language request from one of the plurality of databases by inputting into the machine learning model at least the natural language request; executing the executable query; determining whether the executable query was successful in retrieving the portion of the telematics data; and generating at least a portion of the training data comprising the natural language request and the executable query; and input the training data into the machine learning model, thereby training the machine learning model.

According to an embodiment, the contextual prompt provides to the machine learning model at least one or more features of the plurality of databases and an expected structure of the executable query.

According to an embodiment, the at least one processor is operable to generate the executable query by inputting into the machine learning model at least: an additional contextual prompt, the additional contextual prompt providing to the machine learning model at least an expected structure of the executable query; and the natural language request.

According to an embodiment, the at least one processor is operable to repeat the generating of the training data such that the training data comprises a plurality of natural language requests and corresponding executable queries.

According to an embodiment, the machine learning model is a large language model (LLM).

According to an embodiment, the LLM is a generative artificial intelligence model.

According to an embodiment, the machine learning model does not have access to the plurality of databases.

In another aspect, the present disclosure relates to a method for training a machine learning model, the method comprising operating at least one processor to: provide a plurality of databases, each database storing at least telematics data originating from a plurality of telematics devices installed in a plurality of vehicles; generate training data for training the machine learning model by: generating a natural language request comprising a textual question relating to the telematics data by inputting into the machine learning model at least: a contextual prompt providing to the machine learning model at least one or more features of the plurality of databases; and instructions to generate the natural language request based on the contextual prompt; generating an executable query for retrieving a portion of the telematics data that is responsive to the natural language request from one of the plurality of databases by inputting into the machine learning model at least the natural language request; executing the executable query; determining whether the executable query was successful in retrieving the portion of the telematics data; and generating at least a portion of the training data comprising the natural language request and the executable query; and input the training data into the machine learning model, thereby training the machine learning model.

According to an embodiment, the contextual prompt provides to the machine learning model at least one or more features of the plurality of databases and an expected structure of the executable query.

According to an embodiment, the generating of the executable query comprises operating the at least one processor to input into the machine learning model at least: an additional contextual prompt, the additional contextual prompt providing to the machine learning model at least an expected structure of the executable query; and the natural language request.

According to an embodiment, the method comprises operating the at least one processor to repeat the generating of the training data such that the training data comprises a plurality of natural language requests and corresponding executable queries.

According to an embodiment, the machine learning model is a large language model (LLM).

According to an embodiment, the LLM is a generative artificial intelligence model.

According to an embodiment, the machine learning model does not have access to the plurality of databases.

In another aspect, the present disclosure relates to a non-transitory computer readable medium having instructions stored thereon executable by at least one processor to implement a method described herein.

Other aspects and features of the systems and methods of the present disclosure will become apparent to those ordinarily skilled in the art upon review of the following description of specific embodiments.

BRIEF DESCRIPTION OF THE DRAWINGS

These and other features of the present disclosure will become more apparent in the following detailed description in which reference is made to the appended drawings. The appended drawings illustrate one or more embodiments of the present disclosure by way of example only and are not to be construed as limiting the scope of the present disclosure.

DETAILED DESCRIPTION

Figure 1:
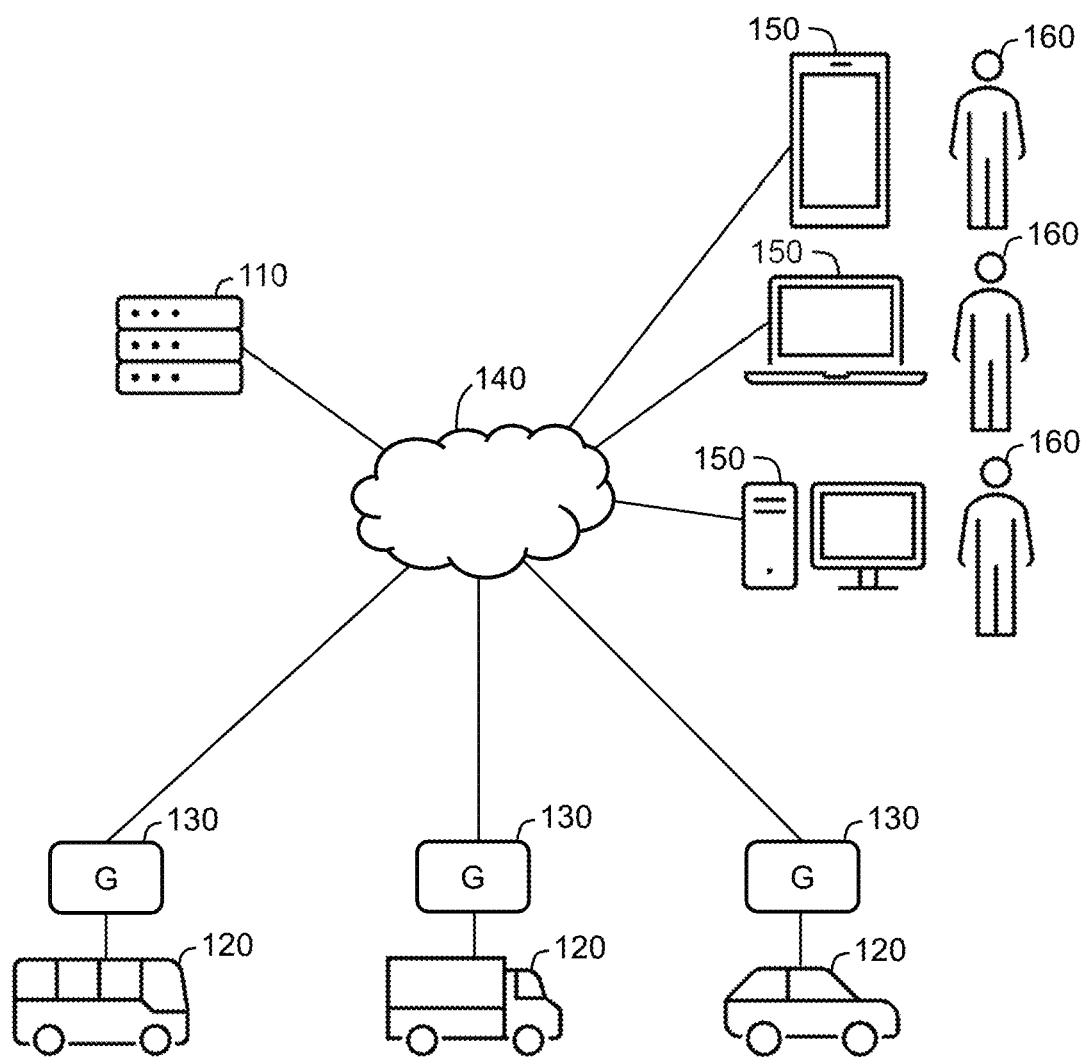
FIG. 1 is a block diagram of various components interacting with an example fleet management system, according to an embodiment of the present disclosure.

Telematics data may include a wide variety of different types of information, parameters, attributes, characteristics, features, and the like relating to various aspects of a vehicle. However, such a wide variety of data may be difficult to manage, especially if the telematics data is collected from a plurality of vehicles (e.g., a vehicle fleet).

For example, a user may wish to retrieve telematics data collected from their vehicle fleet to analyse a property or metric thereof. Conventionally, a user may have to retrieve a comprehensive report that details the telematics data collected from their vehicle fleet in order to analyse properties thereof. As described herein, such reports may include a significant amount of information and, as a result, may be time-consuming to review and difficult to parse and/or process if a user is inexperienced. For example, it may be challenging for some users to identify specific outliers, trends, patterns, etc. from such reports, particularly if the reports include data for many vehicles (e.g., a vehicle fleet). As well, due to the size of such reports, they may require a significant amount of data to obtain (e.g., via downloading) and a significant amount of space to store (e.g., in terms of bytes of a data storage).

It is therefore an object of the present disclosure to provide advantageous systems and methods for retrieving telematics data.

For example, in some embodiments, the systems and methods of the present disclosure may avoid the shortcomings of conventional techniques described above by retrieving only telematics data specifically requested by a user. In more detail, in such embodiments, a user may request a certain type of telematics data or, for example, a particular statistical analysis thereof, and the systems and methods described herein may be operable to return only that which was requested. As will be appreciated, such embodiments may reduce the amount of time spent parsing telematics data collected from a vehicle fleet by a user, as only specific, request telematics data (or analyses thereof) may be returned. As well, by retrieving only particular types of telematics data, the overall size of the information returned may also be reduced, thereby decreasing the amount of data to obtain (e.g., download), as well as the space to store (e.g., in terms of bytes), the telematics data.

Further, as will be described herein, the systems and methods of the present disclosure may also retrieve the telematics data based on a natural language request from a user. As will be appreciated, a natural language request is a request that contains or is structured using "natural" language (i.e., a human language such as English) rather than an "artificial" or "constructed" language such as a computer programming language. By retrieving telematics data based on natural language requests, a user may request specific types of telematics data (or analyses thereof) without needing to be familiar with, for example, computer coding languages, how to execute complex statistical analyses, etc.

In light of the above, the systems and method of the present disclosure may provide a user a simple, efficient (e.g., in terms of time, data, and storage) way to access and process the telematics data collected from their vehicle or vehicle fleet.

Additional advantages will be discussed below and will be readily apparent to those of ordinary skill in the art upon reading the present disclosure.

Reference will now be made in detail to example embodiments of the disclosure, wherein numerals refer to like components, examples of which are illustrated in the accompanying drawings that further show example embodiments, without limitation.

Referring now to FIG. 1, there is shown an example of a fleet management system 110 for managing a plurality of assets equipped with a plurality of telematics devices 130. Each of the telematics devices 130 is capable of collecting various data from the vehicles 120 (i.e., telematics data) and sharing the telematics data with the fleet management system 110. The fleet management system 110 may be remotely located from the telematics devices 130 and the vehicles 120.

The vehicles 120 may include any type of vehicle. For example, the vehicles 120 may include motor vehicles such as cars, trucks (e.g., pickup trucks, heavy-duty trucks such as class-8 vehicles, etc.), motorcycles, industrial vehicles (e.g., buses), and the like. Each motor vehicle may be a gas, diesel, electric, hybrid, and/or alternative fuel vehicle. Further, the vehicles 120 may include vehicles such as railed vehicles (e.g., trains, trams, and streetcars), watercraft (e.g., ships and recreational pleasure craft), aircraft (e.g., airplanes and helicopters), spacecraft, and the like. Each of the vehicles 120 may be equipped with one of the telematics devices 130.

Further, it is noted that, while only three vehicles 120 having three telematics devices 130 are shown in the illustrated example, it will be appreciated that there may be any number of vehicles 120 and telematics devices 130. For example, the fleet management system 110 may manage hundreds, thousands, or even millions of vehicles 120 and telematics devices 130.

In some embodiments, the telematics devices 130 may be standalone devices that are removably installed in the vehicles 120 (e.g., aftermarket telematics devices). In other embodiments, the telematics devices 130 may be integrated components of the vehicles 120 (e.g., pre-installed by an OEM). As described herein, the telematics devices 130 may collect various telematics data and share the telematics data with the fleet management system 110. The telematics data may include any information, parameters, attributes, characteristics, and/or features associated with the vehicles 120. For example, the telematics data may include, but is not limited to, location data, speed data, acceleration data, fluid level data (e.g., oil, coolant, and washer fluid), energy data (e.g., battery and/or fuel level), engine data, brake data, transmission data, odometer data, vehicle identifying data, error/diagnostic data, tire pressure data, seatbelt data, airbag data, or a combination thereof. In some embodiments, the telematics data may include information relating to the telematics devices 130 and/or other devices associated with or connected to the telematics devices 130. Regardless, it should be appreciated the telematics data is a form of electronic data that requires a computer (e.g., a processor such as those described herein) to transmit, receive, interpret, process, and/or store.

Once received, the fleet management system 110 may process the telematics data obtained from the telematics devices 130 to provide various analysis, predictions, reporting, etc. In some embodiments, the fleet management system 110 may process the telematics data to provide additional information about the vehicles 120, such as, but not limited to, trip distances and times, idling times, harsh braking and driving, usage rates, fuel economy, and the like. Various data analytics may be implemented to process the telematics data. The telematics data may then be used to manage various aspects of the vehicles 120, such as route planning, vehicle maintenance, driver compliance, asset utilization, fuel management, etc., which, in turn, may improve productivity, efficiency, safety, and/or sustainability of the vehicles 120.

A plurality of computing devices 150 may provide access to the fleet management system 110 to a plurality of users 160. The users 160 may use computing devices 150 to access or retrieve various telematics data collected and/or processed by the fleet management system 110 to manage and track the vehicles 120. As will be appreciated, the computing devices 150 may be any suitable computing devices. For example, the computing devices 150 may be any type of computers such as, but not limited to, personal computers, portable computers, wearable computers, workstations, desktops, laptops, smartphones, tablets, smartwatches, personal digital assistants (PDAs), mobile devices, and the like. The computing devices 150 may be remotely located from the fleet management system 110, telematic devices 130, and vehicles 120.

The fleet management system 110, telematics devices 130, and computing devices 150 may communicate through a network 140. The network 140 may comprise a plurality of networks and may be wireless, wired, or a combination thereof. As will be appreciated, the network 140 may employ any suitable communication protocol and may use any suitable communication medium. For example, the network 140 may comprise Wi-Fi™ networks, Ethernet networks, Bluetooth™ networks, near-field communication (NFC) networks, radio networks, cellular networks, and/or satellite networks. The network 140 may be public, private, or a combination thereof. For example, the network 140 may comprise local area networks (LANs), wide area networks (WANs), the internet, or a combination thereof. Of course, as will also be appreciated, the network 140 may also facilitate communication with other devices and/or systems that are not shown.

Further, the fleet management system 110 may be implemented using one or more computers. For example, the fleet management system 110 may be implements using one or more computer servers. The servers may be distributed across a wide geographical area. In some embodiments, the fleet management system 110 may be implemented using a cloud computing platform, such as Google Cloud Platform™ and Amazon Web Services™. In other embodiments, the fleet management system 110 may be implemented using one or more dedicated computer servers. In a further embodiment, the fleet management system 110 may be implemented using a combination of a cloud computing platform and one or more dedicated computer servers.

Figure 2:
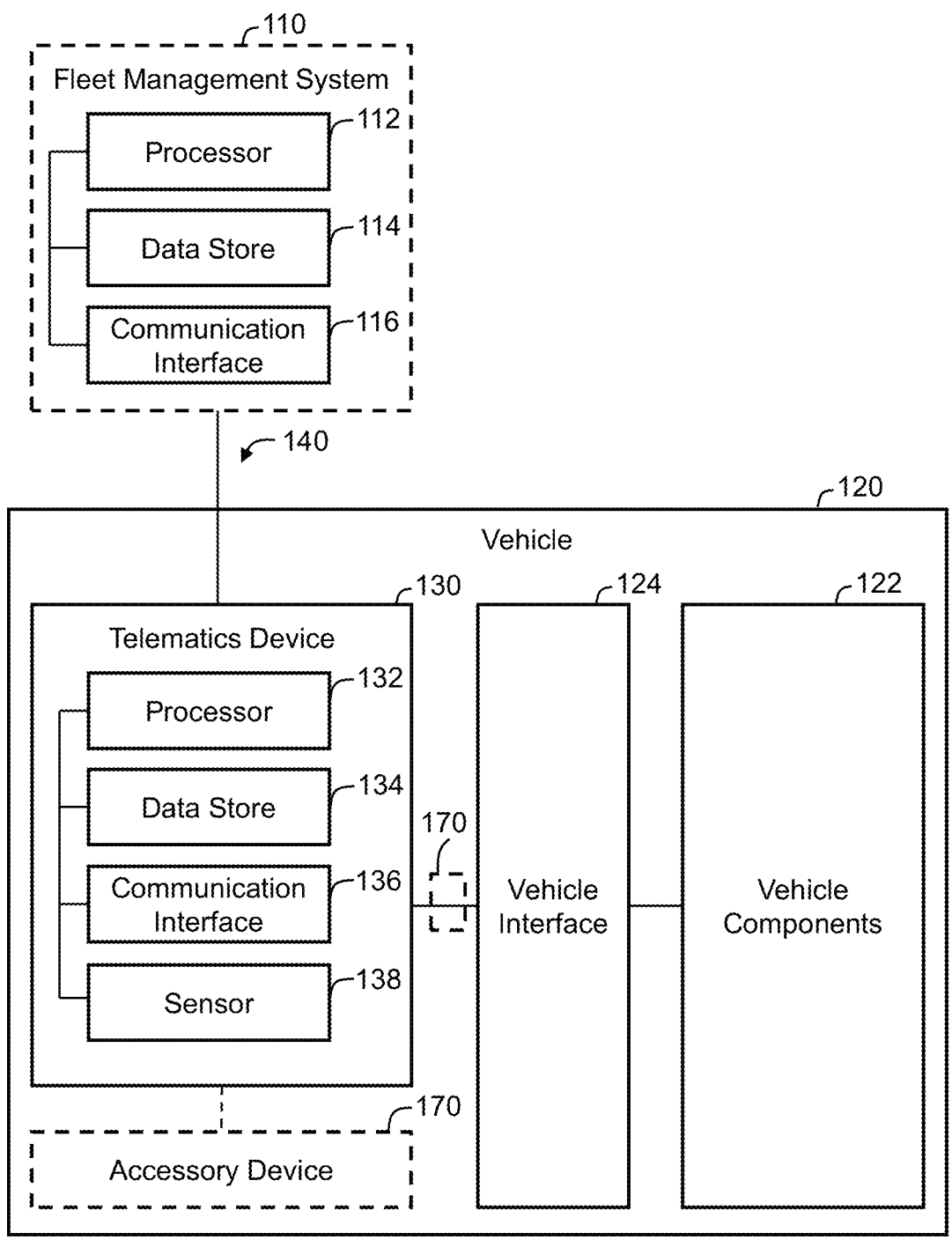
FIG. 2 is a block diagram of an example fleet management system interacting with an example telematics device and an example vehicle, according to an embodiment of the present disclosure.

Referring now to FIG. 2, there is illustrated the fleet management system 110 in communication with one of the telematics devices 130 that is installed in one of the vehicles 120. As shown, the fleet management system 110 may include a processor 112, a data storage 114, and a communication interface 116, each of which may communicate with each other. The processor 112, the data storage 114, and the communication interface 116 may be combined into fewer components, divided into additional subcomponents, or a combination thereof. The components and/or subcomponents may not necessarily be distributed in proximity to one another and may instead be distributed across a wide geographical area.

The processor 112 may control the operation of the fleet management system 110. As will be appreciated, the processor 112 may be implemented using one or more suitable processing devices or systems. For example, the processor 112 may be implemented using central processing units (CPUs), graphics processing units (GPUs), field programmable gate arrays (FPGAs), application specific integrated circuits (ASICs), digital signal processors (DSPs), neural processing units (NPUs), quantum processing units (QPUs), microprocessors, controllers, and the like. The processor 112 may execute various instructions, programs, software, or a combination thereof stored on the data storage 114 to implement various methods described herein. For example, the processor 112 may process various telematics data collected by the fleet management system 110 from the telematics devices 130.

Various data for the fleet management system 110 may be stored on the data storage 114. The data storage 114 may be implemented using one or more suitable data storage devices or systems such as random-access memory (RAM), read only memory (ROM), flash memory, hard disk drives (HDDs), solid-state drives (SSDs), magnetic tape drives, optical disc drives, memory cards, and the like. The data storage 114 may include volatile memory, non-volatile memory, or a combination thereof. Further, the data storage 114 may comprise non-transitory computer readable media. The data storage 114 may store various instructions, programs, and/or software that are executable by the processor 112 to implement various methods described herein. The data storage 114 may store various telematics data collected from the telematics devices 130 and/or processed by the processor 112.

The communication interface 116 may enable communication between the fleet management system 110 and other devices and/or systems, such as the telematics devices 130. The communication interface 116 may be implemented using any suitable communications devices and/or systems. For example, the communication interface 116 may comprise one or more various physical connectors, ports, or terminals such as universal serial bus (USB), ethernet, Thunderbolt, Firewire, serial advanced technology attachment (SATA), peripheral component interconnect (PCI), high-definition multimedia interface (HDMI), DisplayPort, and the like. As another example, the communication interface 116 may comprise one or more wireless interface components to connect to wireless networks such as Wi-Fi™, Bluetooth™, NFC, cellular, satellite, and the like. The communication interface 116 may enable various inputs and outputs to be received at and sent from the fleet management system 110. For example, the communication interface 116 may be used to telematics data from the telematics devices 130.

The telematics devices 130 also may include a processor 134, a data storage 134, and a communication interface 136.

The telematics devices 130 may also comprise a sensor 138. Each of the components of the telematics devices 130 may communicate with each other and may be combined into fewer components or divided into additional subcomponents.

The processor 132 may control the operation of the telematics device 130. The processor 132 may be implemented using any suitable processing devices or systems, such as those described above in relation to the processor 112 of the fleet management system 110. The processor 132 may execute various instructions, programs, software, or a combination thereof stored on the data storage 134 to implement various methods described herein. For example, the processor 132 may process various telematics data obtained from vehicle components 122 and/or the sensor 138.

The data storage 134 may store various data for the telematics device 130. The data storage 134 may be any suitable data storage device or system, such as those described above in relation to the data storage 114 of the fleet management system 110. The data storage 134 may store various instructions, programs, software, or a combination thereof executable by the processor 132 to implement various methods described herein. As well, the data storage 134 may store various telematics data obtained from the vehicle components 122 and/or the sensor 138.

The communication interface 136 may enable communication between the telematics devices 130 and other devices or systems, such as the fleet management system 110 and the vehicle components 122. The communication interface 136 may comprise any suitable communication devices or systems, such as those described above in relation to the communication interface 116 of the fleet management system 110. The communication interface 136 may enable various inputs and outputs to be received at and sent from the telematics devices 130. For example, the communication interface 136 may be used to collect telematics data such as vehicle data from the vehicle components 122 and/or sensor 138, to send telematics data to the fleet management system 110, etc.

The sensor 138 may detect and/or measure various environmental events, changes, etc. The sensor 138 may include any suitable sensing devices or systems, such as, but not limited to, location sensors, velocity sensors, acceleration sensors, orientation sensors, vibration sensors, proximity sensors, temperature sensors, humidity sensors, pressure sensors, optical sensors, audio sensors, and combinations thereof. When the telematics device 130 is installed in the vehicle 120, the sensor 138 may be used to collect telematics data that may not be obtainable from the vehicle components 122. For example, the sensor 138 may include a satellite navigation device such as a global positioning system (GPS) receiver that may measure the location of the vehicle 120. In some embodiments, the sensor 138 may comprise accelerometers, gyroscopes, magnetometers, inertial measurement units (IMUs), or the like that may measure the acceleration and/or orientation of the vehicle 120.

In some embodiments, the telematics devices 130 may operate in conjunction with one or more accessory devices 170 that are in communication therewith. The accessory devices 170 may include one or more expansion devices that may provide additional functionality to the telematics devices 130. For example, the accessory devices 170 may provide additional processing storage, communication, and/or sensing functionality through one or more additional processors, data storages, communication interfaces, and/or sensors (not pictured). The accessory devices 170 may also include adaptor devices that facilitate communication between the communication interface 136 and one or more vehicle interfaces 124, such as a cable harness. The one or more accessory devices 170 may be installed in the vehicle 120 along with the telematics devices 130.

As described herein, the telematics device 130 may be installed within the vehicle 120 removably or integrally. The vehicle 120 may include the vehicle components 122 and the one or more vehicle interfaces 124, which, as will be appreciated, may be combined into fewer components or divided into additional subcomponents. In some embodiments, the vehicle components 122 may comprise any subsystems, parts, subcomponents, or combinations thereof of the vehicle 120. For example, the vehicle components 122 may comprise powertrains, engines, transmissions, steering, braking, seating, batteries, doors, suspensions, etc. The telematics device 130 may obtain various telematics data from the vehicle components 122. For example, in some embodiments, the telematics device 130 may communicate with one or more electrical control units (ECUs) that control the vehicle components 122 or one or more internal sensors thereof.

The vehicle interface 124 may facilitate communication between the vehicle components 122 and other devices or systems. As well, the vehicle interface 124 may comprise any suitable communication devices or systems. For example, the vehicle interface 124 may include an on-board diagnostics (OBD-II) port and/or controller area network (CAN) bus port. The vehicle interface 124 may be used by the telematics device 130 to obtain telematics data from the vehicle components 122. For example, the communication interface 136 may be connected to the vehicle interface 124 to communicate with the vehicle components 122. In some embodiments, the one or more accessory devices 170 (e.g., a wire harness) may provide the connection between the communication interface 136 and the vehicle interface 124.

Figure 3:
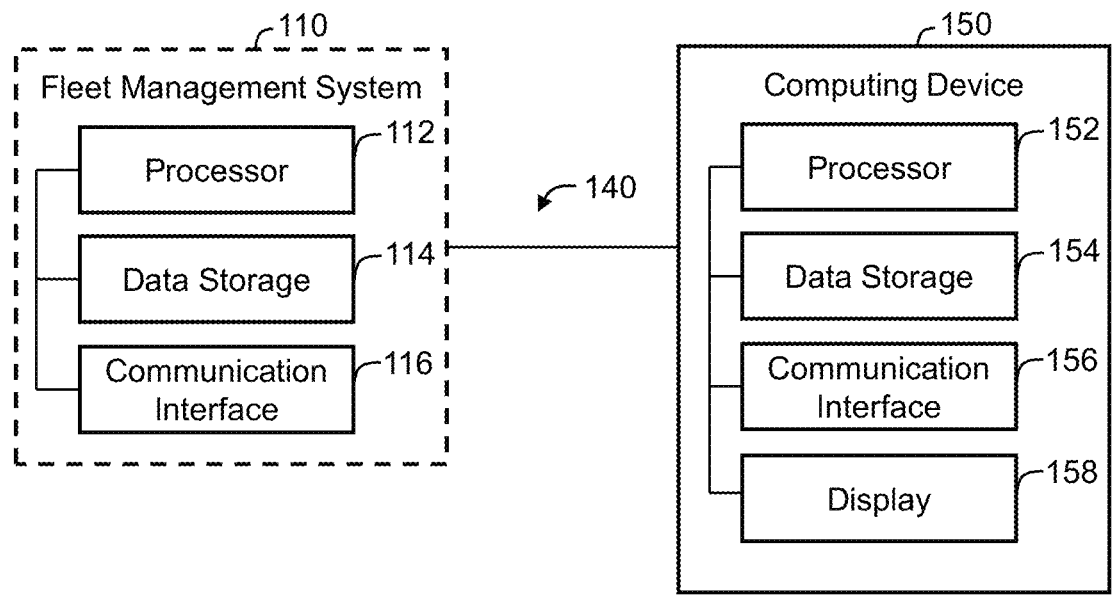
FIG. 3 is a block diagram of an example computing device interacting with an example fleet management system, according to an embodiment of the present disclosure.

Referring now to FIG. 3, there is shown the fleet management system 110 in communication with the computing devices 150. As shown, the computing device 150 may also include a processor 152, a data storage 153, and a communication interface 156. As well, the computing device 150 may include a display 158. Each of the components of the computing device 150 may be communicate with each other and may be combined into fewer components or divided into additional subcomponents.

The processor 152 may control the operation of the computing device 150. The processor 152 may be implemented using any suitable processing devices or systems, such as those described above in relation to the processor 112 of the fleet management system 110. The processor 152 may execute various instructions, programs, software, or a combination thereof stored on the data storage 154 to implement various methods described herein. For example, the processor 152 may process various telematics data received from the fleet management system 110, the telematics devices 130, or a combination thereof.

The data storage 154 may store various data for the computing device 150. The data storage 150 may be any suitable data storage device or system, such as those described above in relation to the data storage 114 of the fleet management system 110. The data storage 154 may store various instructions, programs, software, or a combination thereof executable by the processor 152 to implement various methods described herein. As well, the data storage 154 may store various telematics data received from the fleet management system 110, the telematics devices 130, or a combination thereof.

The communication interface 156 may enable communication between the computing device 150 and other devices or systems, such as the fleet management system 110. The communication interface 156 may be any suitable communication device or system, such as those described above in relation to the communication interface 116 of the fleet management system 110. The communication interface 156 may enable various inputs and outputs to be received at and sent from the computing device 150. For example, the communication interface 156 may be used to retrieve telematics data from the fleet management system 110.

The displays 158 may visually present various data for the computing device 150. The displays 158 may be implemented using any suitable display devices or systems, such as, but not limited to, light-emitting diode (LED) displays, liquid crystal displays (LCD), electroluminescent displays (ELDs), plasma displays, quantum dot displays, cathode ray tube (CRT) displays, and the like. The display 158 may be an integrated component that is integral with the computing device 150 or a standalone device that is removable connected to the computing device 150. The display 158 may display various visual representations of the telematics data.

Figure 4:
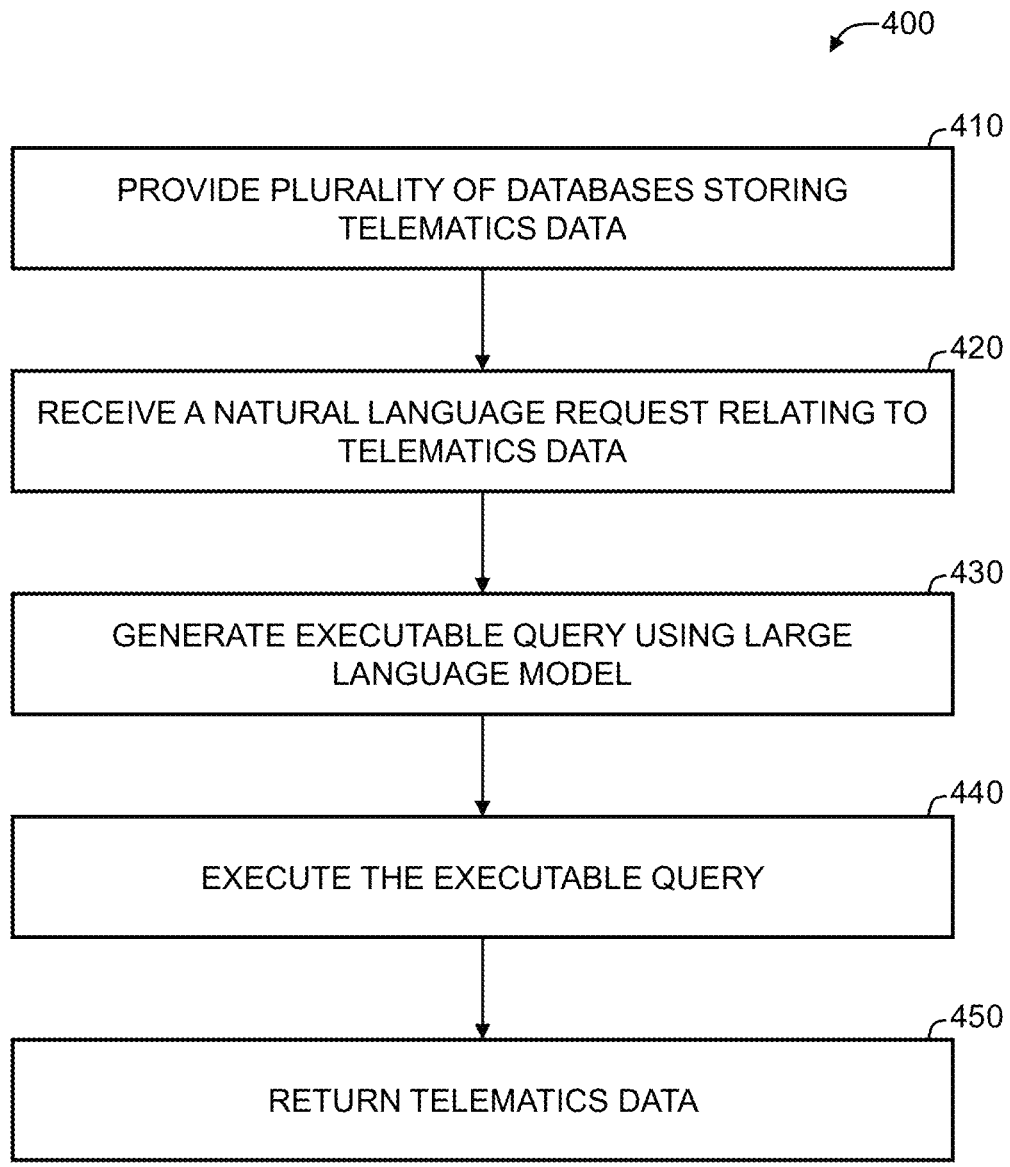
FIG. 4 is a flowchart of an example method for retrieving telematics data, according to an embodiment of the present disclosure.

Referring now to FIG. 4, there is shown an example of a method for retrieving telematics data (400) according to an embodiment of the present disclosure. As shown, the method 400 comprises operating at least one processor to: provide a plurality of databases, each database storing at least telematics data originating from a plurality of telematics devices installed in a plurality of vehicles (410); receive a natural language request from a user, the natural language request comprising at least one textual question relating to the telematics data stored within one of the plurality of databases (420); generate, using a large language model (LLM) that does not have access to the plurality of databases, an executable query for retrieving a portion of the telematics data that is responsive to the natural language request from the database by inputting into the LLM at least: a contextual prompt, the contextual prompt providing to the LLM at least one or more features of the database, an expected structure of the executable query, and one or more example natural language requests and corresponding executable query outputs, and the natural language request (430); execute the executable query for retrieving the portion of the telematics data from the database (440); and return at least the portion of the telematics data to the user, whereby the natural language request is responded to without providing the LLM with access to the telematics data stored on the plurality of databases (450).

The method 400 may be implemented using any suitable combination of hardware and software, such as those described in reference to FIG. 1 to FIG. 3. For example, one or more operations (e.g., operations 410, 420, 430, 440, and/or 450) of the method 400 may be implemented at the fleet management system (e.g., by the processor 112 executing instructions stored on the data storage 114), at the telematics device 130 (e.g., by the processor 132 executing instructions stored on the data storage 134), at the computing devices 150 (e.g., by the processor 152 executing instructions stored on the data storage 154), or a combination thereof.

At operation 410 of the method 400, a plurality of databases may be provided. Each database may store at least telematics data originating from a plurality of telematics devices installed in a plurality of vehicles.

The plurality of databases may be any type of database that is suitable for storing and accessing the telematics data. For example, the plurality of databases may be relational databases, which, as will be appreciated, store information in tables, rows, and columns and may be queried using common computer coding languages such as structured query language (SQL). The plurality of databases may be located on a data storage (e.g., the data storage 114, 134, and/or 154), may be cloud-based (e.g., Cloud SQL), or a combination thereof. The telematics data may be organized within the plurality of databases using any suitable system. For example, each database may include telematics data originating from telematics devices installed in the vehicles of a single user (e.g., a fleet manager).

The telematics data may be obtained from a plurality of vehicles using, for example, the systems outlined in FIG. 1 to FIG. 3. For instance, the telematics data may originate from the telematics devices 130 installed in the plurality of vehicles 120. As described herein, the telematics data may generally include information, parameters, attributes, characteristics, and/or features associated with the vehicle, such as, but not limited to, location data, speed data, acceleration data, fluid level data, energy data, engine data, brake data, transmission data, odometer data, vehicle identifying data, error/diagnostic data, tire pressure data, seatbelt data, and airbag data.

The telematics data stored in the plurality of databases may be "raw" (i.e., unprocessed) data and/or processed data. That is, the telematics data may be obtained from the telematics devices installed in the vehicles and input directly into the databases. Additionally, or alternatively, the telematics data may be processed (e.g., by the fleet management system 110) to provide additional information about the vehicles from which it originates and then included in the plurality of databases. For example, various data analytics may be used to process the telematics data to provide various analysis and/or predictions about the vehicles such as, but not limited to, trip distances and times, idling times, harsh braking and driving, usage rates, fuel economy, etc.

In some embodiments, the telematics data may be curated telematics data. That is, the plurality of databases may include telematics data selected based on factors such as user preferences, commonly requested types of telematics data, commonly requested data analytics, etc.

For example, a database having stored therein curated telematics data may include vehicle performance indicators aggregated across a selected timeframe (e.g., hourly, daily, monthly) such as, but not limited to, vehicle identification numbers, telematics device identifying information, telematics device health information, odometer data (e.g., the highest odometer value measured within the timeframe), operational times (e.g., the total time that the vehicle was actively in operation), idle times (e.g., the total time the vehicle was idling), ignition times (e.g., the total time that the vehicle engine was in ignition), distances travelled, number of stops made, total fuel consumed (e.g., during a trip and/or while idling), fuel economy estimates, fault code information (e.g., the number and/or types of vehicle and/or engine fault codes measured), telematics device fault code information, the latest measured latitudinal and longitudinal values, etc.

By including curated telematics data within the plurality of databases, the telematics data may be more readily retrieved (e.g., via an executable query) and returned to a user, as the databases may include less information (e.g., uncommonly requested types of telematics data and/or data analytics), thereby reducing the total size of the thereof, and a processor (e.g., one or more of the processors 112, 132, 152) may not have to process the data upon receipt of a request from the user (e.g., the curated telematics data may include pre-processed telematics data as described above). As will be appreciated, the overall efficiency of the systems and methods of the present disclosure may, as a result, be increased.

Further, in some embodiments, the at least one data storage may store data in addition to that stored in the plurality of databases. The additional data may be, for instance, data useful when combined with the telematics data stored in each of the plurality of databases. In one non-limiting example, in some embodiments, the at least one data storage may store map data (e.g., map data provided by a map information provider such as Open Street Maps), which, as will be appreciated, may be used to provide additional contextual information to a user requesting certain types of telematics data (e.g., geospatial data, trip data, etc.). In another non-limiting example, the at least one data storage may store data from one or more members of a mobility ecosystem such as, but not limited to, data received from fleet managers, service centers, vehicle parts suppliers, vehicle parts manufacturers (e.g., OEMs and/or third-party manufacturers), and raw material suppliers. As will be appreciated, such data, when used in combination with the telematics data stored in the plurality of databases, may provide a user more information regarding the status of one or more of their vehicles (e.g., more information relating to the maintenance of one or more of their vehicles).

Referring back to FIG. 4, at operation 420, a natural language request from a user may be received. The natural language request may comprise at least one textual question relating to the telematics data stored within one of the plurality of databases. That is, the textual question may be structured in "natural language", which, as described herein, refers to ordinary human language (e.g., "plain" English), rather than an "artificial" or "constructed" language such as a computer programming language.

The textual question may relate to the telematics data stored on the database in that the question is answerable thereby. For example, the textual question may be about a certain type of telematics data, one or more properties of a vehicle or vehicle fleet informed by the telematics data, data analytics performed on the telematics data, etc. Examples of natural language textual questions that relate to telematics data include, but are not limited to, "How much did my fleet idle last month?", "How does the fuel economy of our older vehicles (based on the year of manufacture) compare to our newer vehicles?", "What is the fleet's average fuel economy over the past 6 months?", "Assuming a gas price of $3.5 per gallon, how much money have we lost due to idling in the last 6 months?", "Which vehicles have the lowest idle to drive ratio in the past month?", "Which group is an outlier in terms of idling over the past 6 months?", "How have EVs been adopted in my fleet over the last year", etc.

Of course, it will be appreciated that the textual question may not always be formatted by a user as a question. For example, the textual question may instead be structured as an answerable command. For example, the textual question may be a command such as "List my top 10 vehicles with the lowest utilization over the past week", "List the top 10 groups from highest to lowest idling in the past week", "Provide the vehicles having the lowest idle to drive ratio in the past month", etc. Thus, the textual question may be a question or command that is answerable by the telematics data stored on the database.

The natural language request may be received from the user via any suitable system. For example, a user may input the textual question of the natural language request into a form, a field, or any other suitable interface using a computing device (e.g., the computing devices 150). The textual question may then be sent to a processor (e.g., one or more of the processors 112, 132, 152) via a communication interface (e.g., the communication interface 156) for further processing thereby. In some embodiments, the methods and systems of the present disclosure may be implemented as a chatbot (i.e., may mimic having a conversation with a user during use thereof). In such embodiments, the user may input the natural language request as a portion of a conversation with the chatbot.

As shown at operation 430, an executable query for retrieving a portion of the telematics data that is responsive to the natural language request may be generated. As used herein, an "executable query" generally refers to computer code that, when executed, is capable of retrieving information from a database. Thus, in the context of the systems and methods of the present disclosure, the executable query, when executed, may retrieve the portion of the telematics data from the database. The executable query may be generated in any suitable computer programming language compatible with the plurality of databases. For example, the executable query may be generated in SQL.

The portion of the telematics data that is to be retrieved by the executable query may be responsive to the natural language request of a user in that the portion of the telematics data "answers" the textual question of the natural language request. For example, if the user requests a specific type of telematics data obtained from their vehicle fleet (i.e., a portion of the total telematics data included in the databases), the executable query may retrieve that type of telematics data from the relevant database.

Thus, to respond to the natural language request, the executable query may be generated such that it retrieves the portion of telematics data. However, in some embodiments, depending on the natural language request, the executable query may also process the retrieved telematics data. For example, the executable query may be generated to retrieve and perform one or more mathematical operations to the telematics data such as, but not limited to, one or more statistical analyses. In such embodiments, the processed retrieved portion of telematics data may be responsive to the natural language request.

The executable query may be generated using a machine learning model. The machine learning model may be a model that is capable of converting natural language into computer programming language. The machine learning model may be, for example, an artificial neural network such as a transformer machine learning model. As will be appreciated, such transformer models are often used for processing (or "transforming") natural language prompts. Examples of transformer models include encoder-only models, encoder-decoder models, and decoder-only models. In the example embodiment of FIG. 4, an LLM is used to generate the executable query. As will be appreciated, LLMs are typically large-scale implementations of such transformer models.

Figure 5:
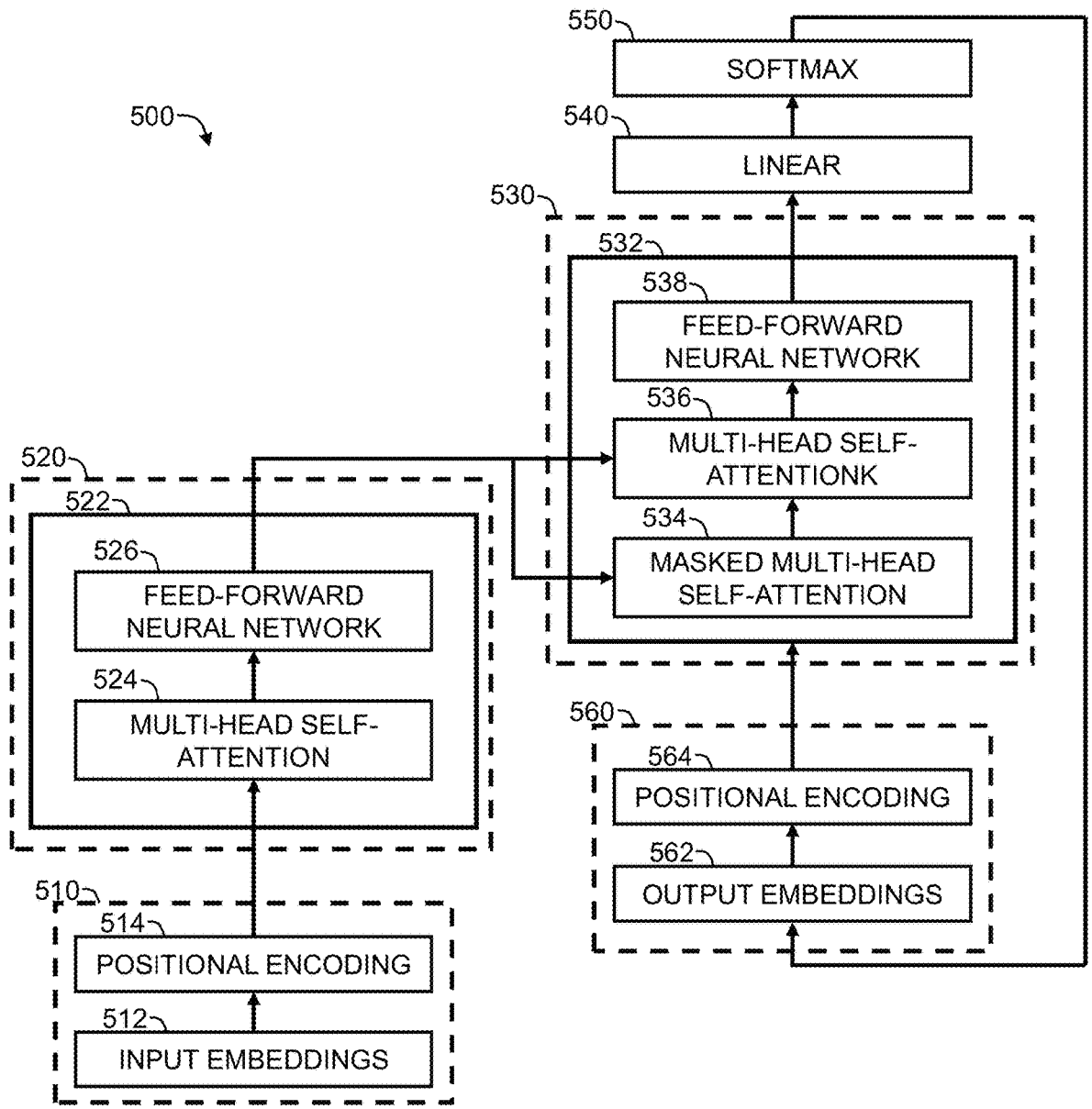
FIG. 5 is a block diagram of an example encoder-decoder transformer model, according to an embodiment of the present disclosure.

For illustrative purposes, FIG. 5 shows a simplified block diagram of an example encoder-decoder transformer model 500. As shown, the transformer model 500 may include: an input layer 510, an encoder component 520, a decoder component 530, a linear layer 540, and a softmax layer 550.

The input layer 510 generally prepares an input for processing by the transformer model 500. The input may be a textual input (e.g., the natural language request) and may sometimes be referred to as a "prompt". The input layer 510 may comprise an input embeddings sublayer 512 and a positional encoding sublayer 514. The input embeddings sublayer 512 may receive the textual input, tokenize the textual input to generate tokens that each correspond to a portion of the textual input (e.g., a word or a portion of a word of a sentence), and generate a vector embedding of the tokens as vectors, the vectors indicating the sematic meaning and/or contextual information of the tokens. The positional encoding sublayer 514 may then positionally encode the vector embedding to include the relative position of each of the tokens within the input (e.g., where words of a sentence are positioned relative to each other and/or within the sentence).

The encoder component 520 generally generates encodings that indicate which tokens are relevant to one another. In more detail, the encoder component 520 may comprise a plurality of encoding layers 522 (for simplicity, only one encoding layer 522 is shown), each of which may comprise a multi-head self-attention sublayer 524 and a feed-forward neural network layer 526. The multi-head self-attention sublayer 524 may receive the vector embedding having the positional information included therein and assign a weight to each of the tokens represented thereby based on their relevance to other tokens (e.g., via a scaled dot-product attention function), thereby generating an attention embedding. Using multi-head attentions, each token may be assigned a weight multiple times in parallel, which may then be averaged (e.g., a weighted average) to determine the assigned weight for each thereof. After the multi-head attention sublayer 524, the attention embedding may be received by the feed-forward neural network sublayer 526, which may perform a plurality of linear regressions to transform the attention embedding into an encoded output for further processing by the transformation model 500 (e.g., the another encoding layer 522 and/or the decoder component 530).

The decoder component 530 generally predicts tokens of an output sequentially (i.e., one-at-a-time) based at least in part on encoded output of the encoder component 530. The decoder component 530 may comprise a plurality of decoding layers 532 (for simplicity, only one decoding layer 532 is shown), each of which may comprise a masked multi-head self-attention sublayer 534, a multi-head self-attention sublayer 536, and a feed-forward neural network layer 538. The masked multi-head self-attention layer 534 and the multi-head self-attention sublayer 536 function substantially the same as the multi-head self-attention sublayer 524 of the encoder component 520. However, it is noted that the masked multi-head self-attention layer 534 also receives each sequential output of the transformer model 500 (e.g., each predicted token as they are predicted) and masks any subsequent tokens such that only earlier (i.e., with respect to an output sentence) tokens are considered when assigning weights, thereby generating a masked output. The multi-head self-attention sublayer 536 may the receive both the encoded output from the encoder component 520 as well as the masked output from the masked multi-head self-attention layer 534 to generate a decoded attention embedding. After the masked multi-head self-attention layer 534 and the multi-head self-attention sublayer 536, the decoded attention embedding may be received by the feed-forward neural network layer 538, which may function substantially the same as the feed-forward neural network sublayer 526, to produce a decoder output.

The decoder output may then be received by linear layer 540, which performs a linear transformation to generate a logits vector based on the decoder output. The softmax layer 550 then converts the logits vector into predicted next-token probabilities, and the next-token associated with a highest probability is selected as the output of the transformation model 500.

If the output of the transformation model 500 indicates that the response is complete, the process may end. Otherwise, the output of the transformation model 500 may be input into the decoder component 530 (i.e., at a masked multi-head self-attention layer 532) and the process may continue. As will be appreciated, if the output of the transformation model 500 is in a natural language, it may first be input into a second input layer 560, comprising an output embeddings sublayer 562 and a positional encoding sublayer 564, which may function substantially the same as the input embeddings sublayer 512 and the positional encoding sublayer 514, respectively, prior to the decoder component 530.

Figure 6:
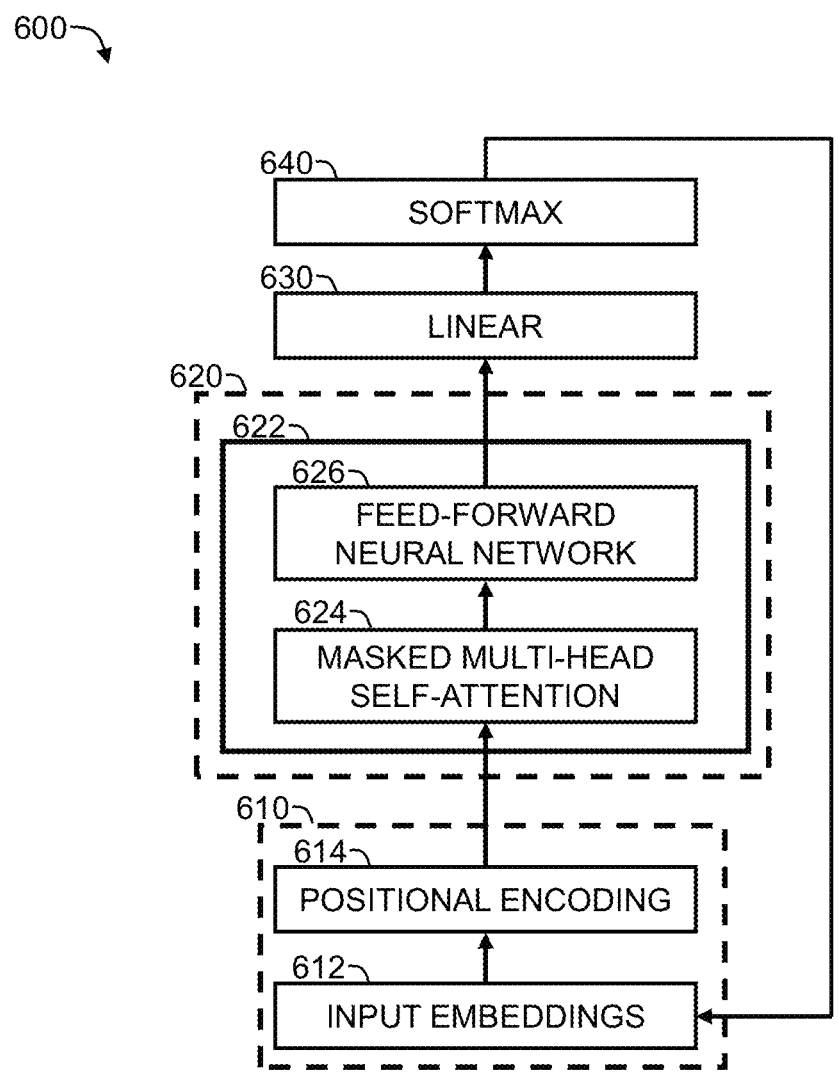
FIG. 6 is a block diagram of an example decoder-only transformer model, according to an embodiment of the present disclosure.

For further illustration, another transformer model 600 is illustrated in FIG. 6. The transformer model 600 is a decoder-only model and is structured similarly to the decoder component 530 of the transformer model 500. In more detail, the transformer model 600 may include an input layer 610, a decoder component 620, a linear layer 630, and a softmax layer 640.

The input layer 610 may comprise an input embeddings sublayer 612 and a positional encoding sublayer 614, which function substantially the same as the input embeddings sublayer 512 and the positional encoding sublayer 514, respectively, of the transformer model 500 to generate a vector embedding having the positional information of the tokens included therein.

The decoder component 620 may comprise a plurality of decoding layers 622 (for simplicity, only one decoding layer 622 is shown), each of each may comprise a masked multi-head self-attention sublayer 624 and a feed-forward neural network layer 626. The masked multi-head self-attention sublayer 624 and the feed-forward neural network layer 626 function substantially the same as the masked multi-head self-attention sublayer 536 and the feed-forward neural network layer 538 of the transformer model 500, respectively. Thus, the decoding layer 522 may not include a non-masked multi-head self-attention sublayer (e.g., the multi-head self-attention sublayers 524, 536). In more detail, the vector embedding output by the input layer 610 is received by the masked multi-head self-attention sublayer 624 and processed through the feed-forward neural network layer 626 and any subsequent decoding layers 622. Each output is generated iteratively (i.e., one-at-a-time) and with reference only to previous outputs.

The linear layer 630 and the softmax layer 640 also function substantially the same as the linear layer 540 and the softmax layer 550, respectively, of the transformer model 500. That is, the linear layer 630 and the softmax layer 640 process the output from the decoder component 620 to select a next-token having a highest probability as the output of the transformer model 600.

Similar to the transformer model 500, if the output of the transformation model 600 indicates that the response to the input is complete, the process may end. Otherwise, the output of the transformation model 600 may be input into the decoder component 620 (i.e., at a masked multi-head self-attention layer 624) and the process may continue. As will be appreciated, if the output of the transformation model 600 is in a natural language, it may first be re-input into the input layer 610 prior to the decoder component 620.

It is noted that transformer models such as the transformer models 500, 600 may be particularly well-suited for parallel implementations, allowing for faster outputs, reduced training times, etc. Due to these characteristics, transformer models are particularly scalable and are capable of being trained on large datasets of text (e.g., text scrapped various internet websites, databases, etc.). As will be appreciated, transformer models are therefore often used as the underlying architectures for LLMs.

Referring back to operation 430 of FIG. 4, the machine learning model (e.g., an LLM) may be used to generate the executable query based at least in part on the natural language request, as will be described herein. The machine learning model used in the methods and systems of the present disclosure may be implemented using any suitable system such as one or more of the systems described in relation to FIG. 1 to FIG. 3 (e.g., operated via one or more of the processors 112, 132, 152).

In more detail, as indicated above, machine learning models such as LLMs may be pre-trained using large amounts of public data (e.g., text scrapped from internet websites) so that they may predict an appropriate output based on an input. However, such models generally do not have access to data contained in private databases—e.g., databases that store a user's confidential telematics data. It may therefore be challenging to use a machine learning model to generate an executable query that is executable to retrieve data (e.g., telematics data) from a private database (i.e., a database that is not accessible to the machine learning model). However, the inventors of the present disclosure surprisingly found that, by providing sufficient context to a machine learning model such as an LLM, it may be capable of generating an executable query that, when executed, may retrieve data from a database inaccessible thereto.

Thus, the executable query for retrieving the telematics data may be generated using, for example, an LLM that does not have access to the plurality of databases storing thereon the telematics data, by inputting into the LLM at least: a contextual prompt, the contextual prompt providing to the LLM at least one or more features of the database, an expected structure of the executable query, and one or more example natural language requests and corresponding executable query outputs, and the natural language request received from the user.

The contextual prompt provides context (e.g., in the form of a textual description) to the machine learning model that may inform the output. As described above, the contextual prompt may provide to the machine learning model, among other things, one or more features of the database (i.e., the database storing the telematics data to which the natural language request relates). The one or more features of the database may include information relating to features of the database such as, but not limited to, how the telematics data is stored in the database, the types of telematics data stores in the database, data analytics functions stored in the database, etc. For example, in some embodiments, the one or more features of the database may comprise table identifying information (e.g., table names indicating the telematics data organized therein) and the schema thereof. In more detail, the schema may include information relating to the telematics data included in the table, the format of that telematics data (e.g., string, timestamp, float, etc.), and a description of the telematics data, structured in a way that is accessible via the executable query.

The contextual prompt may also provide to the machine learning model an expected structure of the executable query. For example, an expected structure of the executable query may include information such as a desired computer programming language of the executable query, the formatting of the executable query, etc. In some embodiments, the expected structure of the executable query is SQL. Additionally, or alternatively, the expected structure may be a wrapped executable query to facilitate the execution thereof immediately after generation. In some embodiments, the expected structure may be an executable query having portions thereof that are replaceable with information specific to the database. In more detail, as described above, the machine learning model will generally not have access to the plurality of databases. Thus, it may in some cases be necessary to insert into the executable query after the generation thereof, certain database identifying information so that the executable query, when executed, may access and retrieve the information stored in the databases. Examples of such database identifying information include, database names, user IDs associated with particular databases, etc.

The contextual prompt may also provide to the machine learning model one or more example natural language requests and corresponding executable query outputs. The one or more example natural language requests and corresponding executable query outputs may comprise, for example, previously input natural language requests and corresponding previously generated executable queries that were successful in retrieving the appropriate portion of telematics data (i.e., the telematics data that was responsive to the natural language requests). Alternatively, or additionally, the one or more example natural language requests and corresponding executable query outputs may comprise one or more natural language requests and corresponding executable query outputs generated by, for example, an administrator of the systems and methods of the present disclosure that would be successful in retrieving the appropriate portion of telematics data.

The one or more example natural language requests and the corresponding executable query outputs may include natural language requests relating to a variety of types of telematics data. For example, the one or more example natural language requests and the corresponding executable query outputs may include those relating to vehicle idling, vehicle distances travelled, vehicle fuel consumption, and/or other miscellaneous queries.

The inventors surprisingly found that, by inputting the contextual prompt that provides at least the one or more features of the database, the expected structure of the executable query, and one or more example natural language requests and corresponding executable query outputs to the machine learning model (e.g., an LLM), the machine learning model may more reliability generate an executable query capable of retrieving telematics data that is responsive to the natural language request without needing access to the databases themselves.

It is noted that, in addition to the one or more features of the database, the expected structure of the executable query, and one or more example natural language requests and corresponding executable query outputs, the contextual prompt may in some cases provide additional contextual information to the machine learning model. For example, in some embodiments, the contextual prompt may provide to the machine learning model textual information about the user implementing the systems and methods described herein, the role of the machine learning model in the systems and methods described herein, instructions for what to output if the natural language request is ambiguous, and the like. Such additional contextual information may further increase the reliability of the machine learning model to generate an executable query capable of retrieving telematics data that is responsive to the natural language request without requiring access to the databases storing the telematics data.

As described above, in addition to the contextual prompt, the natural language request from the user is also input into the machine learning model for generation of the executable query. In some embodiments, the contextual prompt and the natural language request may be input into the machine learning model separately. In such embodiments, the executable query may be generated by first inputting the contextual prompt into the machine learning model and then inputting the natural language request into the machine learning model. In other embodiments, the contextual prompt and the natural language request may be input into the machine learning model together. In such embodiments, the generating of the executable query 430 may further comprise operating the at least one processor to merge the contextual prompt and the natural language request prior to the input thereof into the machine learning model. For example, the text of natural language request may be appended to the text of the contextual prompt.

At operation 440 of FIG. 4, the executable query for retrieving the portion of the telematics data from the database may be executed. The executable query may be executed using any suitable combinations of hardware and software such as, for example, those described herein in relation to FIG. 1 to FIG. 3. Of course, the particular execution of the executable query may depend at least in part on, for example, the structure of the executable query (e.g., the computer programming language that the executable query is generated in).

In some embodiments, the method 400 may further comprise operating the at least one processor to modify the executable query after the generation thereof. As indicated above, the executable query may be modified based on database identifying information, a type of the portion of the telematics data that is responsive to the natural language request, an identify of the user, or a combination thereof. For example, the executable query may be modified to include an identity of the user such that only the database or databases storing telematics data originating from that user's telematics devices are accessible by the executable query. As another example, if the type of the portion of telematics data that is responsive to the natural language request is a type that is often spelled incorrectly, or has different names in different regions (e.g., gas, gasoline, petrol, fuel, etc.), the executable query may be modified to account for such discrepancies.

As will be described herein, in some cases, the executable query may be returned to the user. In such cases, it may be useful to remove any modifications to the executable query so as to omit user identifying information (e.g., the ID of the user), database identifying information that may be confidential for the administrator implementing the systems and methods described herein, or any other information included in the executable query during the modification that might be confidential or unnecessary for a user to view. Thus, in some embodiments, the method 400 may further comprise operating the at least one processor to revert the modifying of the executable query after the execution thereof. The executable query may be reverted, for example, to its original state—i.e., as generated by the machine learning model.

In some cases, it may be useful to determine whether the executable query successfully retrieved the portion of telematics data that is responsive to the natural language request. For example, in some embodiments, the method 400 may further comprise operating the at least one processor to determine whether the executing of the executable query was successful in retrieving the position of the telematics data; and generate, if the executing of the executable query was unsuccessful, an error message comprising at least a textual description of why the telematics data was not retrieved.

The determining of whether the executable query was successful in retrieving the portion of the telematics data may be implemented using any suitable system or technique. For example, the at least one processor (e.g., one or more of the processors 112, 132, 152) may be operable to check one or more of whether the plurality of data bases were accessed, whether the correct database storing the portion of telematics data was accessed, whether any telematics data was retrieved, or any other indication that the portion of telematics data was retrieved, or not retrieved. Of course, the exact technique for determining whether the telematics data was retrieved may vary based at least in part on the particular implementation of the system.

If the at least one processor is unable to determine any indication that the portion of telematics data was retrieved, the error message may be generated. As described above, the error message may comprise at least a textual description of why the telematics data was not retrieved. For example, the error message may explain that the database storing the portion of telematics data was not accessed, that the telematics data was not located at the location included in the executable query, or any other reason why the telematics data was not retrieved. As will be appreciated, an exact reason may differ system to system, based at least in part on the implementation thereof.

Once the error message is generated, it may be returned to the user and/or used to adjust the executable query. For example, in some embodiments, the method 400 may further comprise operating the at least one processor to: generate a corrected executable query for retrieving the portion of the telematics data from the database by inputting into the machine learning model (e.g., an LLM) at least the contextual prompt, the natural language request, and the error message; and execute the corrected executable query for retrieving the portion of the telematics data from the database. In such embodiments, by inputting the error message with the contextual prompt and the natural language request, additional context may be provided to the machine learning model. For example, the machine learning model, may use the error message to adjust or "correct" the executable query based on the textual description of why the telematics data was not retrieved included therein so as to generate a corrected executable query that is capable of retrieving the telematics data that is responsive to the natural language request.

As will be appreciated, in such embodiments, the contextual prompt, the natural language request, and the error message may be input into the machine learning model together or separately (e.g., as described above). For example, in some embodiments, the generating of the corrected executable query may comprise operating the at least one processor to generate the corrected executable query by inputting two or more of the contextual prompt, the natural language request, and the error message together into the machine learning model (e.g., an LLM). In such embodiments, the method 400 may further comprise operating the at least one processor to merge the two or more of the contextual prompt, the natural language request, and the error message prior to the input thereof the machine learning model (e.g., by appending the text of one or more of the inputs to another, as described herein).

Once the corrected executable query is generated, it may be executed to retrieve the telematics data. However, it may in some cases be useful to again check if the corrected executable query retrieves the portion of the telematics data that is responsive to the natural language request. For example, in some embodiments, the method 400 may further comprise operating the at least one processor to determine whether the executing of the corrected executable query was successful in retrieving the portion of the telematics data. The determining of whether the execution of the corrected executable query was successful may be implemented using any suitable system or technique, such as those described above in relation to determining whether the executable query was successful.

If the corrected executable query is determined to be unsuccessful, the above process may be repeated, or not. For example, in some embodiments, if the executing of the corrected executable query was unsuccessful, the method 400 may further comprise operating the at least one processor to repeat the generating of the error message, the generating of the corrected executable query, and the executing of the corrected executable query. In such embodiments, the generating of the error message, the generating of the corrected executable query, and the executing of the corrected executable query until the executing of the corrected executable query retrieves the portion of the telematics data from the database—e.g., until the corrected executable query is determined to have been successful.

In another embodiment, if the executing of the corrected executable query was unsuccessful, the method 400 may further comprise operating the at least one processor to repeat the generating of the error message, the generating of the corrected executable query, and the executing of the corrected executable query a predetermined number of times; and return, if the repeating is performed the predetermined number of times without successfully retrieving the portion of the telematics data, a final error message to the user, the final error message comprising at least a textual description of why the telematics data was not retrieved. That is, in such embodiments, the operations to generate a successful corrected query may be limited to being repeated the predetermined number of times. Such embodiments may be useful to reduce processing times so that a response may be more quickly returned to a user. The predetermined number of times that the repeating of the operations for generating the corrected executable query may be any suitable number and is not particularly limited. For example, the operations for generating the corrected executable query may be repeated 5, 10, 15, or 20 times or any number more or fewer or therebetween if so desired.

As described above, if a successful corrected executable query is not generated after repeating the operations for the generation thereof the predetermined number of times, a final error message comprising a textual description of why the telematics data was not retrieved may be returned to the user. In some embodiments, the final error message may further comprise a textual request for an updated natural language request from the user. In such embodiments, the user may be prompted to input an updated natural language request comprising, for example, a modified or different textual question relating to the telematics data stored on the database so that the methods and systems of the present disclosure may re-attempt to retrieve the desired telematics data.

Referring back to FIG. 4, as shown at operation 450, once retrieved (e.g., by the executable query or the corrected executable query), at least the portion of the telematics data that is responsive to the natural language request may be returned to the user. The portion of the telematics data may be returned using any suitable system, such as those described above in relation to FIG. 1 to FIG. 3. For example, the processor 152 of the computing device 150 may return the telematics data to the user such that it is viewable on the display 158 thereof. As well, the telematics data may be returned in any suitable format. For example, the telematics data may be returned in a table, as a single line of information, as a natural language response, etc.

In some embodiments, additional information or content may be returned to the user with the portion of telematics data. For example, the executable query (or the corrected executable query, as the case may be) may be returned to the user to provide additional information to the user about how the telematics data was retrieved. In such embodiments, it may be desirable to revert any modifications made to the executable query prior to the returning thereof to the user, as previously described herein. As another example, additionally or alternatively, a natural language response may be returned with the telematics data, the natural language response comprising, form example, a textual description of the returned telematics data, a textual response to the textual question of the natural language request that comprises the telematics data, etc. Such configurations may be useful if implementing the systems and methods of the present disclosure as a chatbot, as described above.

It is also noted that the portion of the telematics data that is responsive to the natural language request may be returned to the user without providing the machine learning model (e.g., an LLM) access to the telematics data stored on the plurality of databases, as indicated above. As will be appreciated, machine learning models may retain information processed thereby to inform future outputs. While useful for providing more accurate outputs over time, if confidential information is entered as an input, the machine learning model may permanently retain that confidential information. The systems and methods of the present disclosure avoid such vulnerabilities, as the machine learning model is used to generate the executable query but not access a user's confidential telematics data. As a result, the systems and methods of the present disclosure may be implemented using third-party machine learning models such as publicly available LLMs (e.g., generative artificial intelligence models) without risk of confidential data being retained thereby.

Further, as described above, the contextual prompt input into the machine learning model (e.g., an LLM) may include one or more example natural language requests and corresponding executable query outputs. In some embodiments, the one or more example natural language requests and corresponding executable query outputs may be pre-generated or pre-selected (e.g., by an administrator of the systems and methods of the present disclosure). However, additionally or alternatively, in some embodiments, the one or more example natural language requests may be those that were previously received by one or more users and the corresponding executable query outputs may be those previously generated in response to the previously received natural language requests. In such embodiments, the method 400 may further comprise operating the at least one processor to receive from the user an indication of whether the executable query was responsive to the natural language request. If the user indicates that the executable query was responsive to the natural language request, the method 400 may further comprise operating the at least one processor to merge the natural language request and the executable query to the contextual prompt (e.g., by appending the natural language request and the executable query to the contextual prompt as an additional example) so as to provide additional context to the machine learning model during the next use or implementation of the systems and methods described herein. Additionally, or alternatively, in such embodiments, the method 400 may further comprise operating the at least one processor to send the natural language request and the executable query to a data storage for storage thereon. The natural language request and the executable query, once stored, may then be selected (e.g., by an administrator of the systems and methods of the present disclosure) for addition to the contextual prompt.

Further, as a machine learning model (e.g., an LLM) may be used to generate the executable query, it may be desirable to train, or pre-train, the machine learning model using examples of natural language requests and corresponding executable query outputs. As will be appreciated, a machine learning model may be trained by inputting training data for processing process to, over time, recognize patterns, relationships, etc. therein. As described above, in some embodiments, the method 400 may further comprise operating the at least one processor to send the natural language request and the executable query indicated by the user to have been successful in retrieving telematics data that was responsive to the natural language request to a data storage for storage thereon. In such embodiments, in addition, or alternatively, to inclusion in the contextual prompt, the natural language request and the executable query may be included in training data for training the machine learning model. As will be appreciated, by training the machine learning model, the output executable queries may be generated more quickly and more accurately. As well, by training the machine learning model, less information may need to be provided thereto by way of the contextual prompt, which may increase processing efficiency and thus scalability of the systems and methods of the present disclosure.

However, training a machine learning model using only user inputs (e.g., natural language requests input by users) may take a substantial amount of time, as the amount of useable training data is dependent on the volume of user inputs.

It is therefore another objective of the present disclosure to provide advantageous systems and methods for training a machine learning model.

For example, in some embodiments, the systems and methods of the present disclosure may generate data for training a machine learning model (i.e., training data) to retrieve telematics data that is responsive to a natural language request independently from user inputs. That is, in such embodiments, the systems and methods described herein may generate training data for training a machine learning model (e.g., an LLM) such that the machine learning model may be trained without inputs from users. As indicated above, such embodiments may be particularly useful, as the training of the machine learning model is not limited by the volume of user inputs received. The machine learning model, as a result, may be more quickly trained to retrieve telematics data that is responsive to a natural language request.

Figure 7:
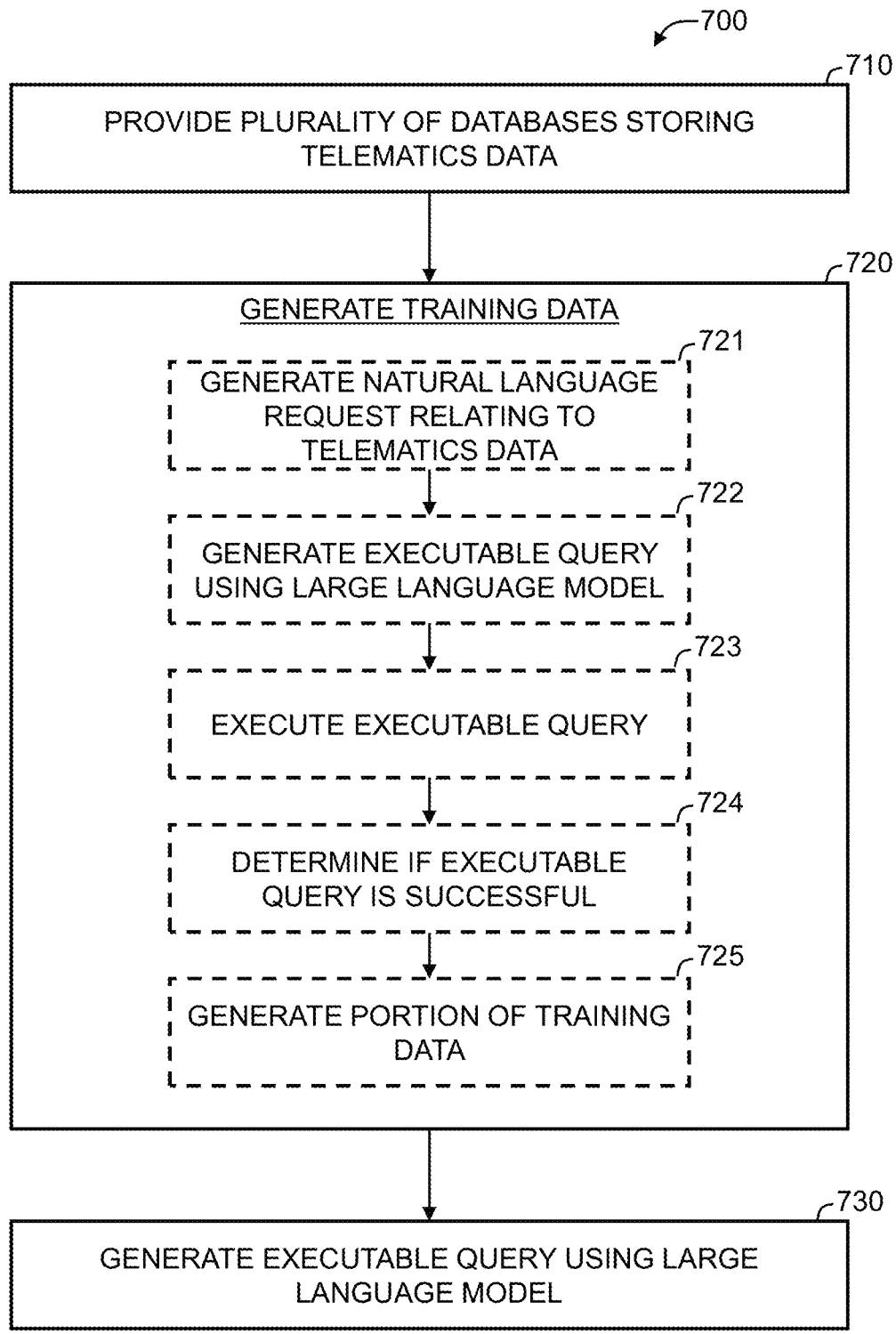
FIG. 7 is a flowchart of an example method for training a machine learning model, according to an embodiment of the present disclosure.

Referring now to FIG. 7, there is shown an example of a method for training a machine learning model (700), according to an embodiment of the present disclosure. The method 700 may comprise operating at least one processor to: provide a plurality of databases, each database storing at least telematics data originating from a plurality of telematics devices installed in a plurality of vehicles (710); generate training data for training the machine learning model (720); and input the training data into the machine learning model, thereby training the machine learning model (730). The generating of the training data for training the machine learning model (720) may comprise: generating a natural language request comprising a textual question relating to the telematics data by inputting into the machine learning model at least: a contextual prompt providing to the machine learning model at least one or more features of the plurality of databases, and instructions to generate the natural language request based on the contextual prompt (721); generating an executable query for retrieving a portion of the telematics data that is responsive to the natural language request from one of the plurality of databases by inputting into the machine learning model at least the natural language request (722); executing the executable query (723); determining whether the executable query was successful in retrieving the portion of the telematics data (724); and generating at least a portion of the training data comprising the natural language request and the executable query (725).

The method 700 may be implemented using any suitable combination of hardware and software, such as those described in reference to FIG. 1 to FIG. 3. For example, one or more operations (e.g., operations 710, 720, 721, 722, 723, 724, 725, and/or 730) of the method 700 may be implemented at the fleet management system (e.g., by the processor 112 executing instructions stored on the data storage 114), at the telematics device 130 (e.g., by the processor 132 executing instructions stored on the data storage 134), at the computing devices 150 (e.g., by the processor 152 executing instructions stored on the data storage 154), or a combination thereof.

At operation 710 of the method 700, a plurality of databases, each storing telematics data originating from a plurality of telematics devices installed in a plurality of vehicles, may be provided. The plurality of databases and the telematics data stored thereon may be implemented as described above in relation to operation 410 of the method 400.

At operation 720 of the method 700, the training data for training the machine learning model (e.g., an LLM) may be generated. As described herein, the training data may be used to train the machine learning model to generate an executable query that is capable of retrieving telematics data that is responsive to a natural language request received from a user. As also described herein, the training data may be generated to facilitate the rapid training of a machine learning model, as the generation is not dependent on the volume of user inputs received.

In more detail, as indicated above, the generating of the training data 720 may comprise operating the at least one processor to generate a natural language request comprising a textual question relating to the telematics data by inputting into the machine learning model at least: a contextual prompt providing to the machine learning model at least one or more features of the plurality of databases, and instructions to generate the natural language request based on the contextual prompt (721). In the context of the method 700, the contextual prompt provides to the machine learning model at least one or more features of the plurality of databases so that the machine learning model may generate a natural language request relating to the telematics data stored thereon. The one or more features of the plurality of databases may include, for example, those previously described herein in relation to operation 430 of the method 400—e.g., how the telematics data is stored in the database, the types of telematics data stores in the database, data analytics functions stored in the database, and the like.

Also input into the machine learning model to generate the natural language request are instructions to generate the natural language request based on the one or more features of the plurality of databases. For example, the instructions may comprise a textual command, description, request, or the like, for the machine learning model to generate a natural language request relating to the telematics data stored within the plurality of databases. The generated natural language request may be formatted and/or structured in the same manner as a natural language request that would be received by a user, for example, as described above in relation to operation 420 of the method 400. In some embodiments, the desired format and/or structure of the natural language request may be included in the instructions.

Once the natural language request is generated, an executable query for retrieving a portion of the telematics data that is responsive to the natural language request from one of the plurality of databases may be generated by inputting into the machine learning model at least the natural language request (722). That is, by inputting at least the natural language request, and in view of the contextual prompt, an executable query that is responsive thereto may be generated by the machine learning model. As will be appreciated, the generating, as well as the structure, of the executable query may be implemented in the same manner as described above in relation to operation 430 of the method 400.

In some embodiments, it may be useful to input additional information into the machine learning model when generating the natural language request and/or the executable query. For example, in the context of the method 700, it may also be useful to include additional contextual information such as an expected structure of the executable query. The desired structure of the executable query may be included in, for example, the contextual prompt input into the machine learning model when generating the natural language request. In another example, the expected structure of the executable query may be included in an additional contextual prompt input into the machine learning model when generating the executable query.

As well, or alternatively, the additional contextual information may include one or more example natural language requests and corresponding executable query outputs. Such examples may be, for example, pre-generated by an administrator of the systems and methods of the present disclosure and used to inform the generation of the training data. The one or more example natural language requests and corresponding executable query outputs may be similar to, or the same as, those described above in relation to the method 400. As well, as indicated above, the one or more example natural language requests and corresponding executable query outputs may be included in the contextual prompt (i.e., with the one or more features of the database), or as an additional contextual prompt.

However, as will be appreciated, as the machine learning model is trained, such additional contextual information may not be required. In fact, in some embodiments, as the machine learning model is trained, no contextual information (e.g., the contextual prompt input in methods 400, 700) may be required.

Once the executable query is generated, it may be executed (723). The executable query may be executed in the same manner as described above in relation to operation 440 of the method 400.

It may then be determined whether the executable query was successful in retrieving the portion of the telematics data (724). As will be described below, if the executable query is successful, it may be used as at least a portion of the training data with the natural language request it is responsive to. The determining of whether the executable query was successful may be implemented in the same manner as described above in relation to the method 400—e.g., the at least one processor may be operable to check one or more of whether the plurality of data bases were accessed, whether the correct database storing the portion of telematics data was accessed, whether any telematics data was retrieved, or any other indication that the portion of telematics data was retrieved, or not retrieved.

If the executable query is determined to have been successful in retrieving the portion of the telematics data, a portion of the training data (i.e., for training the machine learning model) that comprises the natural language request and the executable query may be generated (725). For example, the portion of the training data may be generated by operating the at least one processor to merge the content (e.g., the textual content) of the natural language request and the executable query (e.g., by appending the executable query to the natural language request).

The training data may then be input into the machine learning model, thereby training the machine learning model (430).

Thus, in light of the above, the machine learning model may be used to generate the training data for its own training and without previous user inputs. As will be appreciated, by generating training data in such a manner, the volume of the training data available to train the machine learning model may be increased substantially. As a result, the training of the machine learning model to retrieve telematics data that is responsive to a natural language request from a user is not dependent on previously user-input language requests, thereby increasing the speed at which the machine learning model may be trained.

Furthermore, as indicated above, the machine learning model may be trained to retrieve telematics data with without having access to the plurality of databases that store the telematics data thereon. As described above, such features may be useful when using publicly accessible machine learning models (e.g., LLMs such as generative artificial intelligence models) that may retain confidential information (e.g., the telematics data), potentially making such information available to the public.

In the present disclosure, all terms referred to in singular form are meant to encompass plural forms of the same. Likewise, all terms referred to in plural form are meant to encompass singular forms of the same. Unless defined otherwise, all technical and scientific terms used herein have the same meaning as commonly understood by one of ordinary skill in the art to which this disclosure pertains.

As used herein, the term "about" refers to an approximately +/−10% variation from a given value. It is to be understood that such a variation is always included in any given value provided herein, whether or not it is specifically referred to.

It should be understood that the compositions and methods are described in terms of "comprising," "containing," or "including" various components or steps, the compositions and methods can also "consist essentially of or "consist of the various components and steps. Moreover, the indefinite articles "a" or "an," as used in the claims, are defined herein to mean one or more than one of the element that it introduces.

Throughout this specification and the appended claims, infinitive verb forms are often used, such as "to operate" or "to couple". Unless context dictates otherwise, such infinitive verb forms are used in an open and inclusive manner, such as "to at least operate" or "to at least couple".

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

The Drawings are not necessarily to scale and may be illustrated by phantom lines, diagrammatic representations, and fragmentary views. In certain instances, details that are not necessary for an understanding of the exemplary embodiments or that render other details difficult to perceive may have been omitted.

The specification includes various implementations in the form of block diagrams, schematics, and flowcharts. A person of skill in the art will appreciate that any function or operation within such block diagrams, schematics, and flowcharts can be implemented by a wide range of hardware, software, firmware, or combination thereof. As non-limiting examples, the various embodiments herein can be implemented in one or more of: application-specific integrated circuits (ASICs), standard integrated circuits (ICs), programmable logic devices (PLDs), field-programmable gate arrays (FPGAs), computer programs executed by any number of computers or processors, programs executed by one or more control units or processor units, firmware, or any combination thereof.

The disclosure includes descriptions of several processors. Said processors can be implemented as any hardware capable of processing data, such as application-specific integrated circuits (ASICs), standard integrated circuits (ICs), programmable logic devices (PLDs), field-programmable gate arrays (FPGAs), logic circuits, or any other appropriate hardware. The disclosure also includes descriptions of several non-transitory processor-readable storage mediums. Said non-transitory processor-readable storage mediums can be implemented as any hardware capable of storing data, such as magnetic drives, flash drives, RAM, or any other appropriate data storage hardware. Further, mention of data or information being stored at a device generally refers to the data information being stored at a non-transitory processor-readable storage medium of said device.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Although individual embodiments are discussed, the disclosure covers all combinations of all those embodiments. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of the present disclosure. If there is any conflict in the usages of a word or term in this specification and one or more patent(s) or other documents that may be incorporated herein by reference, the definitions that are consistent with this specification should be adopted.

Many obvious variations of the embodiments set out herein will suggest themselves to those skilled in the art in light of the present disclosure. Such obvious variations are within the full intended scope of the appended claims.

The invention claimed is:

1. A system for retrieving telematics data, the system comprising:
   at least one data storage operable to store at least a plurality of databases, each database storing telematics data originating from a plurality of telematics devices installed in a plurality of vehicles; and
   at least one processor in communication with the at least one data storage, the at least one processor operable to:
      receive a natural language request from a user, the natural language request comprising at least one textual question relating to the telematics data stored within one of the databases;
      generate, using a large language model (LLM) that does not have access to the plurality of databases, an executable query for retrieving a portion of the telematics data that is responsive to the natural language request from the database by inputting into the LLM at least:
         a contextual prompt, the contextual prompt providing to the LLM at least one or more features of the database, an expected structure of the executable query, and one or more example natural language requests and corresponding executable query outputs, and
         the natural language request;
      execute the executable query for retrieving the portion of the telematics data from the database; and
      return at least the portion of the telematics data to the user, whereby the natural language request is responded to without providing the LLM with access to the telematics data stored on the plurality of databases.

2. The system of claim 1, wherein the at least one processor is operable to generate the executable query by inputting the contextual prompt and the natural language request together into the LLM.

3. The system of claim 1, wherein the at least one processor is further operable to modify the executable query based on database identifying information, a type of the portion of the telematics data that is responsive to the natural language request, an identity of the user, or a combination thereof.

4. The system of claim 3, wherein the at least one processor is further operable to revert modifying of the executable query after the execution thereof.

5. The system of claim 1, wherein the at least one processor is further operable to:

determine whether the executing of the executable query was successful in retrieving the portion of the telematics data; and generate, if the executing of the executable query was unsuccessful, an error message comprising at least a textual description of why the telematics data was not retrieved.

6. The system of claim 5, wherein the at least one processor is further operable to:
generate a corrected executable query for retrieving the portion of the telematics data from the database by inputting into the LLM at least the contextual prompt, the natural language request, and the error message; and
execute the corrected executable query for retrieving the portion of the telematics data from the database.

7. The system of claim 1, wherein the at least one processor is further operable to receive from the user an indication of whether the executable query was responsive to the natural language request.

8. The system of claim 1, wherein the LLM comprises a generative artificial intelligence model.

9. The system of claim 1, wherein the one or more features of the database comprise information relating to how the telematics data is stored in the database, a type of telematics data stored in the database, or a combination thereof.

10. A method for retrieving telematics data, the method comprising operating at least one processor to:
provide a plurality of databases, each database storing at least telematics data originating from a plurality of telematics devices installed in a plurality of vehicles;
receive a natural language request from a user, the natural language request comprising at least one textual question relating to the telematics data stored within one of the plurality of databases;
generate, using a large language model (LLM) that does not have access to the plurality of databases, an executable query for retrieving a portion of the telematics data that is responsive to the natural language request from the database by inputting into the LLM at least:
a contextual prompt, the contextual prompt providing to the LLM at least one or more features of the database, an expected structure of the executable query, and one or more example natural language requests and corresponding executable query outputs, and
the natural language request;
execute the executable query for retrieving the portion of the telematics data from the database; and
return at least the portion of the telematics data to the user, whereby the natural language request is responded to without providing the LLM with access to the telematics data stored on the plurality of databases.

11. The method of claim 10, wherein generating of the executable query comprises operating the at least one processor to input the contextual prompt and the natural language request together into the LLM.

12. The method of claim 10, further comprising operating the at least one processor to modify the executable query based on database identifying information, a type of the portion of the telematics data that is responsive to the natural language request, an identity of the user, or a combination thereof.

13. The method of claim 12, further comprising operating the at least one processor to revert the modifying of the executable query after the execution thereof.

14. The method of claim 10, further comprising operating the at least one processor to:
determine whether the executing of the executable query was successful in retrieving the portion of the telematics data; and
generate, if the executing of the executable query was unsuccessful, an error message comprising at least a textual description of why the telematics data was not retrieved.

15. The method of claim 14, further comprising operating the at least one processor to:
generate a corrected executable query for retrieving the portion of the telematics data from the database by inputting into the LLM at least the contextual prompt, the natural language request, and the error message; and
execute the corrected executable query for retrieving the portion of the telematics data from the database.

16. The method of claim 10, further comprising operating the at least one processor to receive from the user an indication of whether the executable query was responsive to the natural language request.

17. The method of claim 10, wherein the LLM comprises a generative artificial intelligence model.

18. The method of claim 10, wherein the one or more features of the database comprise information relating to how the telematics data is stored in the database, a type of telematics data stored in the database, or a combination thereof.

19. A non-transitory computer readable medium having instructions stored thereon executable by at least one processor to implement a method for retrieving telematics data, the method comprising operating at least one processor to:
provide a plurality of databases, each database storing at least telematics data originating from a plurality of telematics devices installed in a plurality of vehicles;
receive a natural language request from a user, the natural language request comprising at least one textual question relating to the telematics data stored within one of the plurality of databases;
generate, using a large language model (LLM) that does not have access to the plurality of databases, an executable query for retrieving a portion of the telematics data that is responsive to the natural language request from the database by inputting into the LLM at least:
a contextual prompt, the contextual prompt providing to the LLM at least one or more features of the database, an expected structure of the executable query, and one or more example natural language requests and corresponding executable query outputs, and
the natural language request;
execute the executable query for retrieving the portion of the telematics data from the database; and
return at least the portion of the telematics data to the user, whereby the natural language request is responded to without providing the LLM with access to the telematics data stored on the plurality of databases.

* * * * *